United States Patent
Balasubramanian et al.

(10) Patent No.: US 12,256,386 B2
(45) Date of Patent: *Mar. 18, 2025

(54) RESOURCE MANAGEMENT TECHNIQUES FOR FULL-DUPLEX AND HALF-DUPLEX VEHICLE-TO-EVERYTHING SYSTEMS

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,745

(22) Filed: Mar. 6, 2023

(65) Prior Publication Data

US 2023/0209552 A1    Jun. 29, 2023

Related U.S. Application Data

(63) Continuation of application No. 17/381,532, filed on Jul. 21, 2021, now Pat. No. 11,606,806.

(Continued)

(51) Int. Cl.
*H04W 4/00* (2018.01)
*H04L 5/16* (2006.01)
(Continued)

(52) U.S. Cl.
CPC .............. *H04W 72/20* (2023.01); *H04L 5/16* (2013.01); *H04L 43/16* (2013.01); *H04W 72/569* (2023.01)

(58) Field of Classification Search
CPC .......... H04W 72/20; H04L 5/16; H04L 43/16
See application file for complete search history.

(56) References Cited

U.S. PATENT DOCUMENTS 10,264,600 B2    4/2019  Huang et al.
10,333,574 B2    6/2019  Baghel et al.
(Continued)

FOREIGN PATENT DOCUMENTS

CN    106792885 B    11/2019
EP      3836660 A1     6/2021
(Continued)

OTHER PUBLICATIONS

International Search Report and Written Opinion—PCT/US2021/042727—ISA/EPO—dated Nov. 11, 2021.

(Continued)

*Primary Examiner* — Elisabeth Benoit Magloire
(74) *Attorney, Agent, or Firm* — Holland & Hart LLP/QUALCOMM Incorporated

(57) ABSTRACT

Methods, systems, and devices for sidelink wireless communications are described in which a user equipment (UE), such as a vehicle UE, that supports full-duplex communications may transmit a sidelink control channel during a set of time resources including scheduling information for a subsequent transmission by the UE via a first set of resources. The UE may receive a sidelink control channel during the set of time resources from a second UE that may support full-duplex communications or half-duplex communications. The sidelink control channel may include scheduling information for a subsequent transmission via a second set of time-frequency resources that at least partially overlaps with the first set of time-frequency resources. The first UE may determine that a collision will occur and may perform a resource selection procedure or may transmit a (Continued)

request for the second device to perform the resource selection procedure.

40 Claims, 21 Drawing Sheets

Related U.S. Application Data

(60) Provisional application No. 63/055,221, filed on Jul. 22, 2020.

(51) Int. Cl.
  *H04L 43/16* (2022.01)
  *H04W 72/20* (2023.01)
  *H04W 72/566* (2023.01)

(56) References Cited

U.S. PATENT DOCUMENTS

| | | | |
|---|---|---|---|
| 10,342,038 B2 | 7/2019 | Sun et al. | |
| 11,432,117 B2* | 8/2022 | Wang | H04W 72/02 |
| 11,606,806 B2 | 3/2023 | Balasubramanian et al. | |
| 2018/0279096 A1* | 9/2018 | Wu | H04W 72/121 |
| 2018/0302197 A1* | 10/2018 | He | H04L 5/14 |
| 2019/0387377 A1 | 12/2019 | Zhang et al. | |
| 2020/0067662 A1* | 2/2020 | Gao | H04L 5/10 |
| 2020/0163103 A1* | 5/2020 | Kuang | H04W 72/23 |
| 2020/0236656 A1 | 7/2020 | Cao et al. | |
| 2020/0322024 A1* | 10/2020 | Cheng | H04W 76/11 |
| 2020/0396718 A1 | 12/2020 | Luo et al. | |
| 2021/0006318 A1 | 1/2021 | Kim et al. | |
| 2021/0306992 A1* | 9/2021 | Uziel | H04W 72/20 |
| 2022/0030441 A1 | 1/2022 | Balasubramanian | |
| 2022/0030612 A1 | 1/2022 | Balasubramanian et al. | |
| 2022/0140964 A1* | 5/2022 | Chen | H04L 5/0048 370/330 |
| 2022/0167313 A1 | 5/2022 | Zhou et al. | |
| 2022/0190984 A1* | 6/2022 | Lee | H04L 1/0026 |
| 2022/0201731 A1* | 6/2022 | Lee | H04W 72/569 |
| 2022/0217697 A1* | 7/2022 | Lee | H04W 72/20 |
| 2022/0256518 A1* | 8/2022 | Hou | H04L 1/1825 |
| 2022/0346079 A1* | 10/2022 | Yoshioka | H04W 74/0833 |
| 2022/0369291 A1* | 11/2022 | Shibaike | H04L 1/1893 |
| 2022/0386319 A1 | 12/2022 | Ying et al. | |
| 2023/0107971 A1* | 4/2023 | Kim | H04W 4/46 370/329 |
| 2023/0126503 A1 | 4/2023 | Ökvist et al. | |
| 2023/0131353 A1* | 4/2023 | Miao | H04W 72/02 370/329 |
| 2023/0131882 A1* | 4/2023 | Lin | H04W 72/0446 370/329 |
| 2023/0184883 A1* | 6/2023 | Li | G01S 7/023 342/59 |
| 2023/0251370 A1 | 8/2023 | Kalantari et al. | |
| 2023/0354311 A1* | 11/2023 | Xue | H04L 1/1822 |

FOREIGN PATENT DOCUMENTS

| | | |
|---|---|---|
| WO | 2020011336 A1 | 1/2020 |
| WO | 2020033719 A1 | 2/2020 |

OTHER PUBLICATIONS

International Search Report and Written Opinion—PCT/US2021/042749—ISA/EPO—dated Dec. 9, 2021.
Medina D., et al., "Interference-Aware Dynamic Resource Allocation for D2D Proximity Services with Beamforming Support", 2015 IEEE Global Communications Conference (Globecom), IEEE, Dec. 6, 2015 (Dec. 6, 2015), 7 pages, XP032872116, DOI: 10.1109/GLOCOM.2014.7416946 [retrieved on Feb. 23, 2016] p. 1-p. 5, figures 2. 4. 5, 7.
Wang L., et al., "Exploiting Full Duplex for Device-to-Device Communications in Heterogeneous Networks," IEEE Communications Magazine, IEEE Service Center, Piscataway, US. vol. 53, No. 5, May 1, 2015 (May 1, 2015), pp. 146-152, XP011581009, ISSN: 0163-6804, DOI: 10.1109/MCOM.2015.7105653 [retrieved on May 11, 2015] p. 146-p. 150, figures 2-5.

* cited by examiner

RESOURCE MANAGEMENT TECHNIQUES FOR FULL-DUPLEX AND HALF-DUPLEX VEHICLE-TO-EVERYTHING SYSTEMS

CROSS REFERENCE

The present application for patent is a continuation of U.S. patent application Ser. No. 17/381,532 by Balasubramanian et al., entitled "RESOURCE MANAGEMENT TECHNIQUES FOR FULL-DUPLEX AND HALFDUPLEX VEHICLE-TO-EVERYTHING SYSTEMS," filed Jul. 21, 2021, which claims the benefit of U.S. Provisional Patent Application No. 63/055,221 by Balasubramanian et al., entitled "RESOURCE MANAGEMENT TECHNIQUES FOR FULL-DUPLEX AND HALFDUPLEX VEHICLE-TO-EVERYTHING SYSTEMS," filed Jul. 22, 2020, each of which is assigned to the assignee hereof, and each of which is expressly incorporated by reference in its entirety herein.

INTRODUCTION

The following relates to wireless communications, and more specifically to managing resources for devices in wireless communications systems, including resource selection techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first device in a wireless network is described. The method may include transmitting a first sidelink control channel during a set of time resources, the first sidelink control channel including scheduling information for transmission of a first sidelink data channel by the first device via a first set of time-frequency resources. The method may also include receiving, from a second device, a second sidelink control channel during the set of time resources, the second sidelink control channel including scheduling information for transmission of a second sidelink data channel by the second device via a second set of time-frequency resources. The method may further include performing a resource selection procedure based on the first set of time-frequency resources at least partially overlapping with the second set of time-frequency resources.

An apparatus for wireless communications at a first device in a wireless network is described. The apparatus may include a processor, and memory coupled to the processor. The processor and memory may be configured to transmit a first sidelink control channel during a set of time resources, the first sidelink control channel including scheduling information for transmission of a first sidelink data channel by the first device via a first set of time-frequency resources. The processor and memory may also be configured to receive, from a second device, a second sidelink control channel during the set of time resources, the second sidelink control channel including scheduling information for transmission of a second sidelink data channel by the second device via a second set of time-frequency resources. The processor and memory may be further configured to perform a resource selection procedure based on the first set of time-frequency resources at least partially overlapping with the second set of time-frequency resources.

Another apparatus for wireless communications at a first device a wireless network is described. The apparatus may include means for transmitting a first sidelink control channel during a set of time resources, the first sidelink control channel including scheduling information for transmission of a first sidelink data channel by the first device via a first set of time-frequency resources. The apparatus may also include means for receiving, from a second device, a second sidelink control channel during the set of time resources, the second sidelink control channel including scheduling information for transmission of a second sidelink data channel by the second device via a second set of time-frequency resources. The apparatus may further include means for performing a resource selection procedure based on the first set of time-frequency resources at least partially overlapping with the second set of time-frequency resources.

A non-transitory computer-readable medium storing code for wireless communications at a first device a wireless network is described. The code may include instructions executable by a processor to transmit a first sidelink control channel during a set of time resources, the first sidelink control channel including scheduling information for transmission of a first sidelink data channel by the first device via a first set of time-frequency resources. The code may also include instructions executable by the processor to receive, from a second device, a second sidelink control channel during the set of time resources, the second sidelink control channel including scheduling information for transmission of a second sidelink data channel by the second device via a second set of time-frequency resources. The code may further include instructions executable by the processor to perform a resource selection procedure based on the first set of time-frequency resources at least partially overlapping with the second set of time-frequency resources.

In some examples of the method, apparatuses, and non-transitory computer-readable medium described herein, the first device receives the second sidelink control channel while concurrently transmitting the first sidelink control channel.

Some examples of the method, apparatuses, and non-transitory computer-readable medium described herein may further include operations, features, means, or instructions for determining a priority associated with the second sidelink data channel may be greater than a priority associated with the first sidelink data channel.

Some examples of the method, apparatuses, and non-transitory computer-readable medium described herein may further include operations, features, means, or instructions for selecting a third set of time-frequency resources that may be different from the second set of time-frequency resources. Some examples of the method, apparatuses, and non-transitory computer-readable medium described herein may further include operations, features, means, or instructions for transmitting, to the second device, an updated sidelink control channel including updated scheduling information for transmission of the first sidelink data channel by the first device via the third set of time-frequency resources.

Some examples of the method, apparatuses, and non-transitory computer-readable medium described herein may further include operations, features, means, or instructions for determining that a signal-to-noise ratio of the received second sidelink control channel satisfies a threshold. Some examples of the method, apparatuses, and non-transitory computer-readable medium described herein may further include operations, features, means, or instructions for selecting a third set of time-frequency resources that may be different from the second set of time-frequency resources, where the third set of time-frequency resources includes a subset of the first set of time-frequency resources based on the signal-to-noise ratio of the received second sidelink control channel satisfying the threshold.

In some examples of the method, apparatuses, and non-transitory computer-readable medium described herein, the subset of the first set of time-frequency resources includes at least a portion of time-frequency resources that may be different from the second set of time-frequency resources.

Some examples of the method, apparatuses, and non-transitory computer-readable medium described herein may further include operations, features, means, or instructions for transmitting, to the second device, an indication that the first set of time-frequency resources and the second set of time-frequency resources at least partially overlap. Some examples of the method, apparatuses, and non-transitory computer-readable medium described herein may further include operations, features, means, or instructions for receiving, from the second device, an updated sidelink control channel including updated scheduling information for transmission of the second sidelink data channel by the second device via a third set of time-frequency resources.

In some examples of the method, apparatuses, and non-transitory computer-readable medium described herein, the indication may be transmitted during a period of time in which the second device may be operating in a receive mode.

In some examples of the method, apparatuses, and non-transitory computer-readable medium described herein, the indication indicates physical resource blocks or time slots, or both, in which the first set of time-frequency resources and the second set of time-frequency resources overlap.

In some examples of the method, apparatuses, and non-transitory computer-readable medium described herein, the indication includes a single bit indication that indicates the first set of time-frequency resources and the second set of time-frequency resources at least partially overlap.

In some examples of the method, apparatuses, and non-transitory computer-readable medium described herein, the indication includes a number of resources in which the first set of time-frequency resources and the second set of time-frequency resources overlap.

Some examples of the method, apparatuses, and non-transitory computer-readable medium described herein may further include operations, features, means, or instructions for determining a priority associated with the second sidelink data channel and a priority associated with the first sidelink data channel may be the same.

Some examples of the method, apparatuses, and non-transitory computer-readable medium described herein may further include operations, features, means, or instructions for determining a second transmission identifier associated with the second sidelink data channel may be greater than a first transmission identifier associated with the first sidelink data channel. Some examples of the method, apparatuses, and non-transitory computer-readable medium described herein may further include operations, features, means, or instructions for selecting a third set of time-frequency resources that may be different from the second set of time-frequency resources based on the determining that the second transmission identifier associated with the second sidelink data channel may be greater than the first transmission identifier associated with the first sidelink data channel.

Some examples of the method, apparatuses, and non-transitory computer-readable medium described herein may further include operations, features, means, or instructions for selecting a third set of frequency resources including resources at least a portion of the first set of time-frequency resources and the second set of time-frequency resources.

In some examples of the method, apparatuses, and non-transitory computer-readable medium described herein, the third set of frequency resources may be randomly selected.

Some examples of the method, apparatuses, and non-transitory computer-readable medium described herein may further include operations, features, means, or instructions for determining a second transmission identifier associated with the second sidelink data channel may be less than a first transmission identifier associated with the first sidelink data channel. Some examples of the method, apparatuses, and non-transitory computer-readable medium described herein may further include operations, features, means, or instructions for selecting a third set of time-frequency resources.

In some examples of the method, apparatuses, and non-transitory computer-readable medium described herein, the third set of time-frequency resources includes odd numbered resources of the first set of time-frequency resources and the second set of time-frequency resources.

In some examples of the method, apparatuses, and non-transitory computer-readable medium described herein, the third set of time-frequency resources includes even numbered resources of the first set of time-frequency resources and the second set of time-frequency resources.

Some examples of the method, apparatuses, and non-transitory computer-readable medium described herein may further include operations, features, means, or instructions for transmitting, to the second device, signaling indicating selection of a third set of time-frequency resources by the first device.

In some examples of the method, apparatuses, and non-transitory computer-readable medium described herein, the third set of time-frequency resources includes resources different than the first set of time-frequency resources and the second set of time-frequency resources.

In some examples of the method, apparatuses, and non-transitory computer-readable medium described herein, the third set of time-frequency resources includes odd numbered resources of the first set of time-frequency resources and the second set of time-frequency resources.

In some examples of the method, apparatuses, and non-transitory computer-readable medium described herein, the third set of time-frequency resources includes even numbered resources of the first set of time-frequency resources and the second set of time-frequency resources.

A method for wireless communications at a first device that supports half-duplex communications in a wireless network is described. The method may include transmitting a first sidelink control channel during a set of time resources, the first sidelink control channel including scheduling information for transmission of a sidelink data channel by the first device via a first set of time-frequency resources. The method may also include receiving, from a second device, an indication that the first set of time-frequency resources at least partially overlaps with a second set of time-frequency resources reserved by the second device. The method may also include selecting a third set of time-frequency resources that is different from the reserved set of time-frequency resources based on receiving the indication.

An apparatus for wireless communications at a first device that supports half-duplex communications in a wireless network is described. The apparatus may include a processor, and memory coupled to the processor. The processor and memory may be configured to transmit a first sidelink control channel during a set of time resources, the first sidelink control channel including scheduling information for transmission of a sidelink data channel by the first device via a first set of time-frequency resources. The processor and memory may also be configured to receive, from a second device, an indication that the first set of time-frequency resources at least partially overlaps with a second set of time-frequency resources reserved by the second device. The processor and memory may be further configured to select a third set of time-frequency resources that is different from the reserved set of time-frequency resources based on receiving the indication.

Another apparatus for wireless communications at a first device that supports half-duplex communications in a wireless network is described. The apparatus may include means for transmitting a first sidelink control channel during a set of time resources, the first sidelink control channel including scheduling information for transmission of a sidelink data channel by the first device via a first set of time-frequency resources. The apparatus may also include means for receiving, from a second device, an indication that the first set of time-frequency resources at least partially overlaps with a second set of time-frequency resources reserved by the second device. The apparatus may further include means for selecting a third set of time-frequency resources that is different from the reserved set of time-frequency resources based on receiving the indication.

A non-transitory computer-readable medium storing code for wireless communications at a first device that supports half-duplex communications in a wireless network is described. The code may include instructions executable by a processor to transmit a first sidelink control channel during a set of time resources, the first sidelink control channel including scheduling information for transmission of a sidelink data channel by the first device via a first set of time-frequency resources. The code may also include instructions executable by the processor to receive, from a second device, an indication that the first set of time-frequency resources at least partially overlaps with a second set of time-frequency resources reserved by the second device. The code may further include instructions executable by the processor to select a third set of time-frequency resources that is different from the reserved set of time-frequency resources based on receiving the indication.

In some examples of the method, apparatuses, and non-transitory computer-readable medium described herein, the third set of time-frequency resources includes a set of resources that overlap between the first set of time-frequency resources and the second set of time-frequency resources.

Some examples of the method, apparatuses, and non-transitory computer-readable medium described herein may further include operations, features, means, or instructions for transmitting, to the second device, an updated sidelink control channel including updated scheduling information for transmission of the sidelink data channel by the first device via the third set of time-frequency resources.

In some examples of the method, apparatuses, and non-transitory computer-readable medium described herein, the indication indicates physical resource blocks or time slots, or both, in which the first set of time-frequency resources and the second set of time-frequency resources overlap.

In some examples of the method, apparatuses, and non-transitory computer-readable medium described herein, the indication includes a single bit indication that indicates the first set of time-frequency resources and the second set of time-frequency resources at least partially overlap.

A method of wireless communications at a device that supports full-duplex communications in a wireless network is described. The method may include transmitting a first sidelink control channel during a set of time resources, the first sidelink control channel including scheduling information for transmission of a first sidelink data channel by the device via a first set of time-frequency resources. The method may also include receiving, from a second device, a second sidelink control channel during the set of time resources, the second sidelink control channel including scheduling information for transmission of a second sidelink data channel by the second device via a second set of time-frequency resources, determining that the first set of time-frequency resources and the second set of time-frequency resources at least partially overlap. The method may further include performing a resource selection procedure based on determining that the first set of time-frequency resources and the second set of time-frequency resources at least partially overlap.

An apparatus for wireless communications at a device that supports full-duplex communications in a wireless network is described. The apparatus may include a processor and memory coupled to the processor. The processor and memory may be configured to transmit a first sidelink control channel during a set of time resources, the first sidelink control channel including scheduling information for transmission of a first sidelink data channel by the device via a first set of time-frequency resources. The processor and memory may also be configured to receive, from a second device, a second sidelink control channel during the set of time resources, the second sidelink control channel including scheduling information for transmission of a second sidelink data channel by the second device via a second set of time-frequency resources. The processor and memory may further be configured to determine that the first set of time-frequency resources and the second set of time-frequency resources at least partially overlap. The processor and memory may further be configured to perform a resource selection procedure based on determining that the first set of time-frequency resources and the second set of time-frequency resources at least partially overlap.

Another apparatus for wireless communications at a device that supports full-duplex communications in a wireless network is described. The apparatus may include means for transmitting a first sidelink control channel during a set of time resources, the first sidelink control channel including scheduling information for transmission of a first sidelink data channel by the device via a first set of time-frequency resources. The apparatus may also include means for receiving, from a second device, a second sidelink control channel during the set of time resources, the second sidelink control channel including scheduling information for transmission of a second sidelink data channel by the second device via a second set of time-frequency resources. The apparatus may also include means for determining that the first set of time-frequency resources and the second set of time-frequency resources at least partially overlap. The apparatus may further include means for performing a resource selection procedure based on determining that the first set of time-frequency resources and the second set of time-frequency resources at least partially overlap.

A non-transitory computer-readable medium storing code for wireless communications at a device that supports full-duplex communications in a wireless network is described. The code may include instructions executable by a processor to transmit a first sidelink control channel during a set of time resources, the first sidelink control channel including scheduling information for transmission of a first sidelink data channel by the device via a first set of time-frequency resources. The code may also include instructions executable by the processor to receive, from a second device, a second sidelink control channel during the set of time resources, the second sidelink control channel including scheduling information for transmission of a second sidelink data channel by the second device via a second set of time-frequency resources. The code may also include instructions executable by the processor to determine that the first set of time-frequency resources and the second set of time-frequency resources at least partially overlap The code may also include instructions executable by the processor to perform a resource selection procedure based on determining that the first set of time-frequency resources and the second set of time-frequency resources at least partially overlap.

Some examples of the method, apparatuses, and non-transitory computer-readable medium described herein may further include operations, features, means, or instructions for determining a priority associated with the second sidelink data channel may be greater than a priority associated with the first sidelink data channel.

Some examples of the method, apparatuses, and non-transitory computer-readable medium described herein may further include operations, features, means, or instructions for selecting a third set of time-frequency resources that may be different from the second set of time-frequency resources. Some examples of the method, apparatuses, and non-transitory computer-readable medium described herein may further include operations, features, means, or instructions for transmitting, to the second device, an updated sidelink control channel including updated scheduling information for transmission of the first sidelink data channel by the device via the third set of time-frequency resources.

Some examples of the method, apparatuses, and non-transitory computer-readable medium described herein may further include operations, features, means, or instructions for determining that a signal-to-noise ratio of the received second sidelink control channel satisfies a threshold. Some examples of the method, apparatuses, and non-transitory computer-readable medium described herein may further include operations, features, means, or instructions for selecting a third set of time-frequency resources that may be different from the second set of time-frequency resources, where the third set of time-frequency resources includes a subset of the first set of time-frequency resources based on the signal-to-noise ratio of the received second sidelink control channel satisfying the threshold.

In some examples of the method, apparatuses, and non-transitory computer-readable medium described herein, the subset of the first set of time-frequency resources includes at least a portion of time-frequency resources that may be different from the second set of time-frequency resources.

Some examples of the method, apparatuses, and non-transitory computer-readable medium described herein may further include operations, features, means, or instructions for transmitting, to the second device, an indication that the first set of time-frequency resources and the second set of time-frequency resources at least partially overlap. Some examples of the method, apparatuses, and non-transitory computer-readable medium described herein may further include operations, features, means, or instructions for receiving, from the second device, an updated sidelink control channel including updated scheduling information for transmission of the second sidelink data channel by the second device via a third set of time-frequency resources.

In some examples of the method, apparatuses, and non-transitory computer-readable medium described herein, the indication may be transmitted during a period of time in which the second device may be operating in a receive mode.

In some examples of the method, apparatuses, and non-transitory computer-readable medium described herein, the indication indicates physical resource blocks or time slots, or both, in which the first set of time-frequency resources and the second set of time-frequency resources overlap.

In some examples of the method, apparatuses, and non-transitory computer-readable medium described herein, the indication includes a single bit indication that indicates the first set of time-frequency resources and the second set of time-frequency resources at least partially overlap.

In some examples of the method, apparatuses, and non-transitory computer-readable medium described herein, the indication includes a number of resources in which the first set of time-frequency resources and the second set of time-frequency resources overlap.

Some examples of the method, apparatuses, and non-transitory computer-readable medium described herein may further include operations, features, means, or instructions for determining a priority associated with the second sidelink data channel and a priority associated with the first sidelink data channel may be the same.

Some examples of the method, apparatuses, and non-transitory computer-readable medium described herein may further include operations, features, means, or instructions for determining a transmission identifier associated with the second sidelink data channel may be greater than a transmission identifier associated with the first sidelink data channel. Some examples of the method, apparatuses, and non-transitory computer-readable medium described herein may further include operations, features, means, or instructions for selecting a third set of time-frequency resources that may be different from the second set of time-frequency resources based on the determining that the transmission identifier associated with the second sidelink data channel may be greater than the transmission identifier associated with the first sidelink data channel.

Some examples of the method, apparatuses, and non-transitory computer-readable medium described herein may further include operations, features, means, or instructions for selecting a third set of frequency resources including resources at least a portion of the first set of time-frequency resources and the second set of time-frequency resources.

In some examples of the method, apparatuses, and non-transitory computer-readable medium described herein, the third set of frequency resources may be randomly selected.

Some examples of the method, apparatuses, and non-transitory computer-readable medium described herein may further include operations, features, means, or instructions for determining a transmission identifier associated with the second sidelink data channel may be less than a transmission identifier associated with the first sidelink data channel. Some examples of the method, apparatuses, and non-transitory computer-readable medium described herein may further include operations, features, means, or instructions for selecting a third set of time-frequency resources.

In some examples of the method, apparatuses, and non-transitory computer-readable medium described herein, the third set of time-frequency resources includes odd numbered resources of the first set of time-frequency resources and the second set of time-frequency resources.

In some examples of the method, apparatuses, and non-transitory computer-readable medium described herein, the third set of time-frequency resources includes even numbered resources of the first set of time-frequency resources and the second set of time-frequency resources.

Some examples of the method, apparatuses, and non-transitory computer-readable medium described herein may further include operations, features, means, or instructions for transmitting, to the second device, signaling indicating selection of a third set of time-frequency resources by the device.

In some examples of the method, apparatuses, and non-transitory computer-readable medium described herein, the third set of time-frequency resources includes resources different than the first set of time-frequency resources and the second set of time-frequency resources.

In some examples of the method, apparatuses, and non-transitory computer-readable medium described herein, the third set of time-frequency resources includes odd numbered resources of the first set of time-frequency resources and the second set of time-frequency resources.

In some examples of the method, apparatuses, and non-transitory computer-readable medium described herein, the third set of time-frequency resources includes even numbered resources of the first set of time-frequency resources and the second set of time-frequency resources.

Some examples of the method, apparatuses, and non-transitory computer-readable medium described herein may further include operations, features, means, or instructions for transmitting, to the second device, a request for the second device to select a third set of time-frequency resources.

A method of wireless communications at a device that supports half-duplex communications in a wireless network is described. The method may include transmitting a first sidelink control channel during a set of time resources, the first sidelink control channel including scheduling information for transmission of a sidelink data channel by the device via a first set of time-frequency resources. The method may also include receiving, from a second device, an indication that the first set of time-frequency resources at least partially overlaps with a second set of time-frequency resources reserved by the second device. The method may also include selecting a third set of time-frequency resources that is different from the reserved set of time-frequency resources based on receiving the indication.

An apparatus for wireless communications at a device that supports half-duplex communications in a wireless network is described. The apparatus may include a processor and memory coupled to the processor. The processor and memory may be configured to cause the apparatus to transmit a first sidelink control channel during a set of time resources, the first sidelink control channel including scheduling information for transmission of a sidelink data channel by the device via a first set of time-frequency resources. The processor and memory may also be configured to cause the apparatus to receive, from a second device, an indication that the first set of time-frequency resources at least partially overlaps with a second set of time-frequency resources reserved by the second device. The processor and memory may further be configured to cause the apparatus to select a third set of time-frequency resources that is different from the reserved set of time-frequency resources based on receiving the indication.

Another apparatus for wireless communications at a device that supports half-duplex communications in a wireless network is described. The apparatus may include means for transmitting a first sidelink control channel during a set of time resources, the first sidelink control channel including scheduling information for transmission of a sidelink data channel by the device via a first set of time-frequency resources. The apparatus may also include means for receiving, from a second device, an indication that the first set of time-frequency resources at least partially overlaps with a second set of time-frequency resources reserved by the second device. The apparatus may also include means for selecting a third set of time-frequency resources that is different from the reserved set of time-frequency resources based on receiving the indication.

A non-transitory computer-readable medium storing code for wireless communications at a device that supports half-duplex communications in a wireless network is described. The code may include instructions executable by a processor to transmit a first sidelink control channel during a set of time resources, the first sidelink control channel including scheduling information for transmission of a sidelink data channel by the device via a first set of time-frequency resources. The code may include instructions executable by a processor to receive, from a second device, an indication that the first set of time-frequency resources at least partially overlaps with a second set of time-frequency resources reserved by the second device. The code may include instructions executable by a processor to select a third set of time-frequency resources that is different from the reserved set of time-frequency resources based on receiving the indication.

Some examples of the method, apparatuses, and non-transitory computer-readable medium described herein may further include operations, features, means, or instructions for transmitting, to the second device, an updated sidelink control channel including updated scheduling information for transmission of the sidelink data channel by the device via the third set of time-frequency resources.

In some examples of the method, apparatuses, and non-transitory computer-readable medium described herein, the indication indicates physical resource blocks or time slots, or both, in which the first set of time-frequency resources and the second set of time-frequency resources overlap.

In some examples of the method, apparatuses, and non-transitory computer-readable medium described herein, the indication includes a single bit indication that indicates the first set of time-frequency resources and the second set of time-frequency resources at least partially overlap.

In some examples of the method, apparatuses, and non-transitory computer-readable medium described herein, the indication includes a number of resources in which the first set of time-frequency resources and the second set of time-frequency resources overlap.

DETAILED DESCRIPTION

Figure 1:
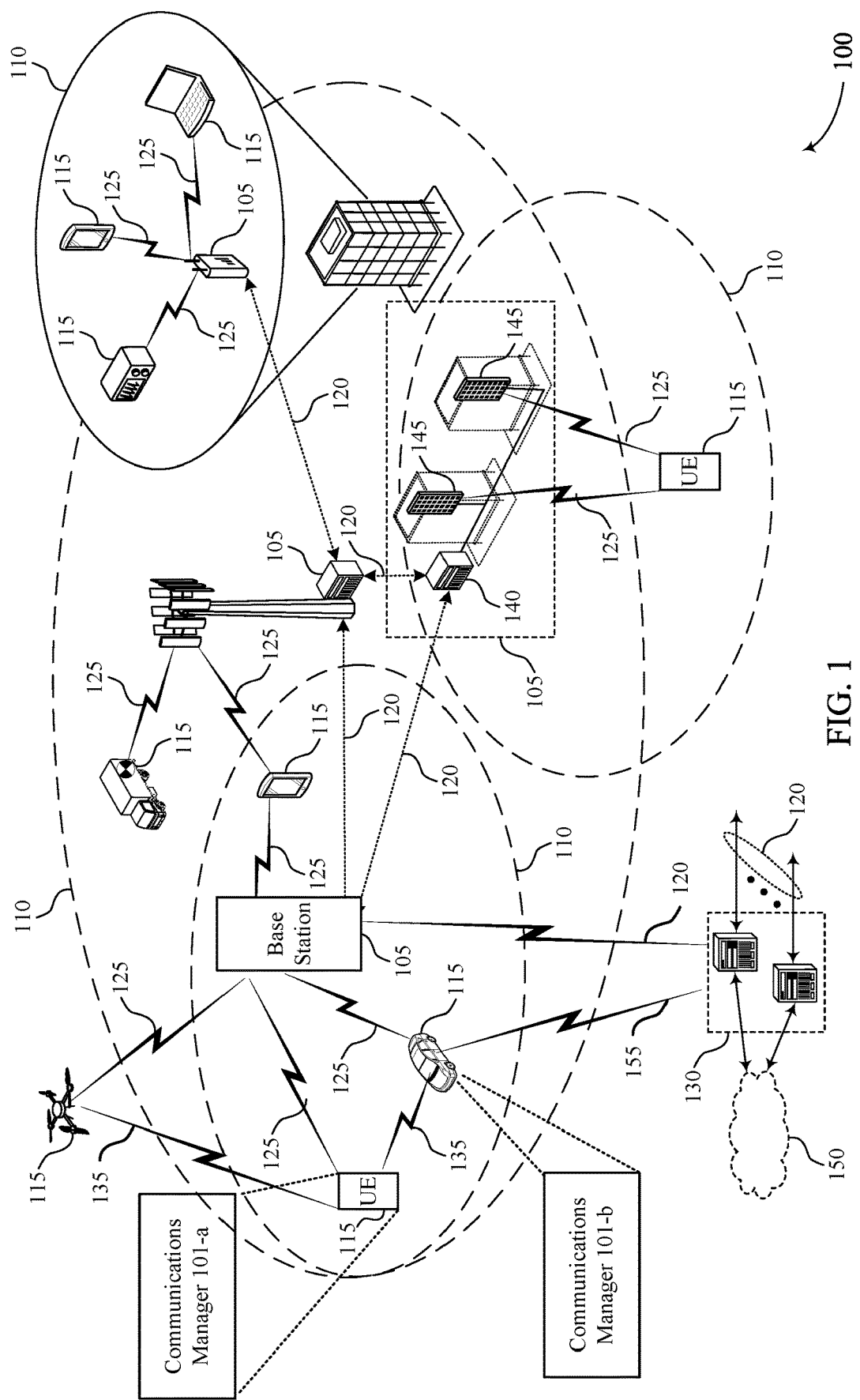
FIG. 1 illustrates an example of a wireless communications system that supports resource management techniques for full-duplex and half-duplex V2X systems in accordance with one or more aspects of the present disclosure.

A wireless communications system may support both access links and sidelinks for communications between wireless devices. An access link may refer to a communication link between a UE and a base station. For example, an access link may support uplink signaling, downlink signaling, connection procedures, etc. A sidelink may refer to a communication link between similar wireless devices (e.g., a communication link between UEs, or a backhaul communication link between base stations). It is noted that while various examples provided herein are discussed for UE sidelink devices, such sidelink techniques may be used for any type of wireless communications devices (e.g., UEs, base stations, etc.) that use sidelink communications. For example, a sidelink may support device-to-device (D2D) communication, V2X and/or vehicle-to-vehicle (V2V) communication, message relaying, discovery signaling, beacon signaling, or any combination of these or other signals transmitted over-the-air from between devices.

In some sidelink communication systems (e.g., V2X system), a UE (e.g., a vehicle such as an automobile, watercraft, drone, or the like) may transmit data to, and receive data from other UEs using sidelink communication channels (e.g., time-frequency resources allocated for sidelink communications). For example, a UE within a V2X system may transmit sidelink data to inform other UEs about a state of a vehicle or may transmit data to assist vehicles with certain tasks (e.g., autonomous driving). In some cases, a UE in a V2X system may maintain accurate system information by attempting to receive data packets from each neighboring UE. In some V2X systems, UEs may operate according to a half-duplex mode when transmitting and receiving data, where the UE may be configured to transmit or receive data during a time period. Such V2X systems may include methods for resource management for half-duplex-enabled UEs.

As demand for sidelink resources increases (e.g., due to increased V2X demand for autonomous and semi-autonomous vehicles), techniques to efficiently and reliably enhance throughput of sidelink channels may be desirable. For example, in some V2X systems, UEs may operate according to the half-duplex mode when transmitting and receiving data. However, incorporating UEs that operate according to a full-duplex mode when transmitting and receiving data, (where the full-duplex-enabled UE may be configured to transmit and receive data during a same time period) may increase spectral efficiency enabling V2X systems to share large payloads (e.g., sensor sharing messages). As the number of full-duplex-enabled UEs in V2X systems increases, there may be a transition period in which such systems include full-duplex-enabled UEs alongside half-duplex-enabled UEs (half-duplex UEs). While some systems may include resource management techniques for half-duplex UEs, it may be desirable to implement efficient resource management techniques for full-duplex UEs as full-duplex UEs are introduced, e.g., within V2X systems.

In some examples, some wireless communications systems (e.g., V2X) may enable autonomous resource allocation which may include time-frequency resource reservation techniques. For example, a UE may transmit during a first time period (e.g., during a set of one or more communication resources in time) and may reserve a number of resources for a second time period (e.g., in a number of future time slots) for a subsequent transmission. The transmission during the first time period may include one or more of a transport block (TB), control information, data, etc. The transmitting UE may indicate the reserved resources to other UEs by sidelink control information (SCI) included in the transmission during the first time period. In some examples, the transmitting UE may transmit scheduling information indicating the reserved resources to other UEs. In some cases, the reserved resources may be used for retransmission of a TB transmitted during the first time period. In some cases, the reserved resources may be used to transmit a new TB. Such resource reservation methods may include protocols or techniques that support resource reservation and may further support a transition from half-duplex UEs to full-duplex UEs. For example, a V2X systems may implement specific protocols that enable autonomous resource reservation that may be different from e.g., D2D systems, user to user (UU) systems, or the like. As such, collisions caused by autonomous resource reservation involving at least one full-duplex capable UE may be associated with V2X systems or the like.

The UE may take resource reservations made by other UEs into account when reserving resources for future transmissions. For example, when a half-duplex UE is not transmitting, it may be listening for transmissions from other UEs (e.g., transmissions including SCI) which the half-duplex UE may decode and consider when selecting resources. However, a half-duplex UE may not be aware of reservation information that is transmitted by other UEs at the same time the half-duplex UE is transmitting. Therefore, it is possible that the half-duplex UE and another UE in the V2X system may reserve resources during the same future time period. Transmissions from multiple UEs may be frequency division multiplexed enabling different UEs to reserve different resources (e.g., subchannels) during a same time period (e.g., slot) but in some cases reserved resources may overlap and may cause a potential collision.

In some examples, the half-duplex UE may transmit control information including resource reservation information during a same time period (e.g., during a set of time resources) as a full-duplex UE transmits control information including reservation information (e.g., scheduling information indicating which time and frequency resources are reserved for subsequent transmission). The half-duplex UE and full-duplex UE may transmit at the same time and may both reserve frequency resources for a same future time period. In some cases, the reserved frequency resources may overlap (e.g., at least partially overlap where at least one frequency resource may be reserved by both the full-duplex UE and half-duplex UE) and may cause a collision. The half-duplex UE may not be aware of the collision because it was transmitting at the same time as the full-duplex UE (e.g., not listening, operating in a transmit mode), but the full-duplex UE may be aware of the collision because the full-duplex UE may transmit and receive at a same time. In some cases, the reserved frequency resources may not overlap but the half-duplex UE may not receive a transmission from the full-duplex UE during the reserved future time period because the half-duplex UE may also transmit in the reserved future time period and may miss additional resource reservation information. Techniques for resource management between half-duplex UEs and full-duplex UEs may therefore be desired.

For example, the full-duplex UE may detect and avoid the collision by performing a resource selection procedure. For example, the full-duplex UE performing the resource reselection procedure may select a new set of resources for the reservation or may select some new resources for the reservation to avoid collision with the half-duplex UE transmission. The full-duplex UE may then update its SCI with the updated resource reservation information (e.g., indicating a set of frequency resources that avoid collision) and may transmit the updated SCI while the half-duplex UE is in a receive mode (e.g., is operating such that it may receive signaling rather than transmit signaling). In such examples, the half-duplex UE may not be aware of the collision and thus be agnostic to the selection procedure. In some cases, the reselection is performed by the full-duplex UE based on the future transmission priority of the full-duplex UE being less than or equal to a future transmission priority of the half-duplex UE. In some cases, the full-duplex UE will perform the selection procedure regardless of future transmission priorities.

In some examples, the full-duplex UE may transmit an indication of the collision to the half-duplex UE requesting that the half-duplex UE perform the resource selection procedure. In some cases, the indication may include a number of physical resource blocks, time slots, or other resources in which the collisions occur, or a one bit indication of a future collision, or the like. For example, the indication may convey a number of resources in which a collision will occur or may indicate whether or not a collision will occur. The half-duplex UE may receive the indication and select a new set of resources for the reservation or may select some new resources for the reservation to avoid collision with the full-duplex UE transmission. The half-duplex UE may then update its SCI with the updated resource reservation information and may transmit the updated SCI.

In some cases, UEs in full-duplex systems may experience high self-interference from transmitting and receiving simultaneously (e.g., the transmissions from the UE at least partially overlap with the receipt of transmissions at the UE). In one aspect, the high self-interference may be due to interference caused by transmitting antennas to receive antennas. This high self-interference may be mitigated by analog and digital cancellation techniques and thus may be managed effectively. This may enable a full-duplex UE to efficiently transmit and receive during a same time period. There may exist conditions in which a full-duplex UE may not leverage full-duplex capabilities and may either transmit or receive at one time. For example, the full-duplex UE may experience clutter echo due to objects or other UEs in the vicinity causing undesirable signal-to-noise ratio (SNR) ratios at the full-duplex UE at the full-duplex. The full-duplex UE may determine that its decoding capabilities may be unreliable based on the SNR and may operate according to reduced full-duplex capabilities (e.g., may sometimes operate according to half-duplex capabilities).

In some examples, the full-duplex UE may transmit during a same time period as a second full-duplex UE and both UEs may reserve resources for a same future time period. In some cases, the reserved frequency resources may overlap and may cause a collision or, in some cases, the reserved frequency resources may not overlap but the second UE may not receive a transmission from the first full-duplex UE that is transmitted during the future reserved time resources in some situations (e.g., situations where the second full-duplex UE has reduced full-duplex capability as described herein). Techniques for resource management between full-duplex UEs may therefore be desired.

For example, the first full-duplex UE and the second full-duplex UE may receive the sidelink transmission, decode the SCI from the other full-duplex UE, and infer a resource collision during the future time slot. Additionally, one or both of the full-duplex UEs may measure an SNR based on the received transmission and may determine that decoding may be unreliable. In some cases, the full-duplex UE with a lower priority future transmission may performs resource reselection and may select a new or partially new set of resources to reserve. In some cases, the priority of the full-duplex UEs may be equal and the full-duplex UE with a lower transmit ID (e.g., a smaller transmit ID number) may reselect a new or partially new set of resources to reserve or both full-duplex UEs. In some cases, both full-duplex UEs may reselect a partially new set of resources. For example, the full-duplex UE with a higher transmission priority may select odd-numbered resources of the set of reserved resources and the full-duplex UE with a higher transmission priority may select even-numbered resources of the set of reserved resources, or vice versa. In some cases, one full-duplex UE (e.g., the full-duplex UE with the higher/lower transmission priority, the higher/lower transmission ID, or the like) may transmit explicit signaling to the other full-duplex UE requesting that the other full-duplex perform a selection procedure or indicating that the transmitting full-duplex UE will perform the selection procedure. For example, the receiving full-duplex UE may receive an indication to select odd-numbered resources or even-numbered resources of the set of reserved resources, or a new set of resources or may receive an indication that the transmitting full-duplex UE will select odd-numbered resources or even-numbered resources of the set of reserved resources, or a new set of resources.

The described techniques may support system efficiency such that a UE may efficiently reuse or avoid using resources that are occupied by another UE. The described techniques may support techniques for resource reselection and resource management in V2X systems that support one or more of autonomous resource selection, full-duplex UEs, or resource reservation. In this way, the full-duplex UE may transmit in a greater number of resources, potentially increasing throughput for the V2X system compared to other V2X systems that do not include full-duplex UEs. Therefore, the described techniques may allow for greater transmission flexibility at the UE and more efficient use of available resources. As such, supported techniques may include improved network operations and, in some examples, may promote device and network efficiencies, among other aspects.

Aspects of the disclosure are initially described in the context of wireless communications systems. Aspects of the disclosure are further illustrated by and described with reference to segmentation schemes, a process flow, apparatus diagrams, system diagrams, and flowcharts that relate to resource allocation and segmentation in wireless systems.

FIG. 1 illustrates an example of a wireless communications system 100 that supports resource management techniques for full-duplex and half-duplex V2X systems in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) (e.g., sidelink) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). In some aspects, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems (e.g., V2X systems) a UE 115 may transmit physical sidelink control channel (PSCCH) or physical sidelink shared channel (PSSCH) during a first time period and may reserve a number of resources (e.g., RBs) for a second time period (e.g., in a number of future time slots). The transmission during the first time period may include one or more of a transport block (TB), control information, data, etc. The UE 115 may indicate the reserved resources to other UEs 115 by SCI included in the transmission during the first time period. In some cases, the reserved resources may be used for retransmission of a TB transmitted during the first time period. In some cases, the reserved resources may be used to transmit a new TB.

The UE 115 may make resource reservations based on receiving reservation information from one or more other UE 115. For example, the UE 115 may reserve resources that are separate from other reserved resources. The UE 115 in the V2X system may have half-duplex capabilities and the half-duplex UE 115 is in a receive mode (e.g., not transmitting) it may be monitoring for transmissions from other UE 115 that include SCI. The half-duplex UE 115 may decode the SCI and take the decoded scheduling information into account when selecting resources. However, the half-duplex UE 115 may not be aware of reservation information that is transmitted at the same time the half-duplex UE 115 is transmitting. The half-duplex UE 115 and another UE 115 in the V2X system may reserve resources during the same future time period which may cause a collision.

In some examples, the half-duplex UE 115 may transmit control information including resource reservation information during a same time period as a full-duplex UE 115 transmits control information including reservation information for a same future time period. In some cases, the reserved frequency resources may overlap and may cause a collision. The half-duplex UE 115 may not be aware of the collision because it was transmitting at the same time as the full-duplex UE (e.g., in a transmit mode, not listening, or the like), but the full-duplex UE 115 may be aware of the collision because full-duplex capabilities include transmitting and receiving at a same time. In some cases, the reserved frequency resources may not overlap but the half-duplex UE 115 may not receive a subsequent transmission from the full-duplex UE 115 during the reserved future time and may miss additional resource reservation information.

In some cases, UE 115 with full-duplex capabilities may experience interference conditions (e.g., noise clutter echo, or the like) and may not leverage the full-duplex capabilities and may occasionally either transmit or receive at one time. For example, the full-duplex UE 115 may experience clutter echo due to objects or other UEs in the vicinity causing undesirable signal-to-noise (SNR) ratios at the full-duplex UE 115. The full-duplex UE 115 may determine that its decoding capabilities may be unreliable based on the SNR and may operate according to reduced full-duplex capabilities (e.g., may sometimes operate according to half-duplex capabilities).

In some examples, the full-duplex UE may transmit during a same time period as a second full-duplex UE and both UEs may reserve resources for a same future time period. In some cases, the reserved frequency resources may overlap and may cause a collision or, in some cases, the reserved frequency resources may not overlap but the second UE may not receive a transmission from the first full-duplex UE that is transmitted during the future reserved time resources in some situations (e.g., situations where the second full-duplex UE has reduced full-duplex capability as described herein). Techniques for resource management between full-duplex UEs may therefore be desired.

UEs 115 may include a communications manager 101, which may enable a UE 115 to reselect resources for one or more subsequent transmission for transmitting data or control information. A full-duplex UE 115 may concurrently transmit with and reserve the same future resources for subsequent transmission as a half-duplex UE 115 or another full-duplex UE 115. The communications manager 101 may initiate a selection procedure to avoid such collisions. For example, the communications manager 101 may perform the selection procedure, may request that the other UE 115 perform the resource reselection, and/or may transmit an indication of the collision based on one or more of a priority of the subsequent transmissions, the transmission ID of the subsequent transmissions, or a measured SNR, or the like. In some cases, an entirely new set of resources may be selected, or a partially new set of resources may be selected.

Figure 2:
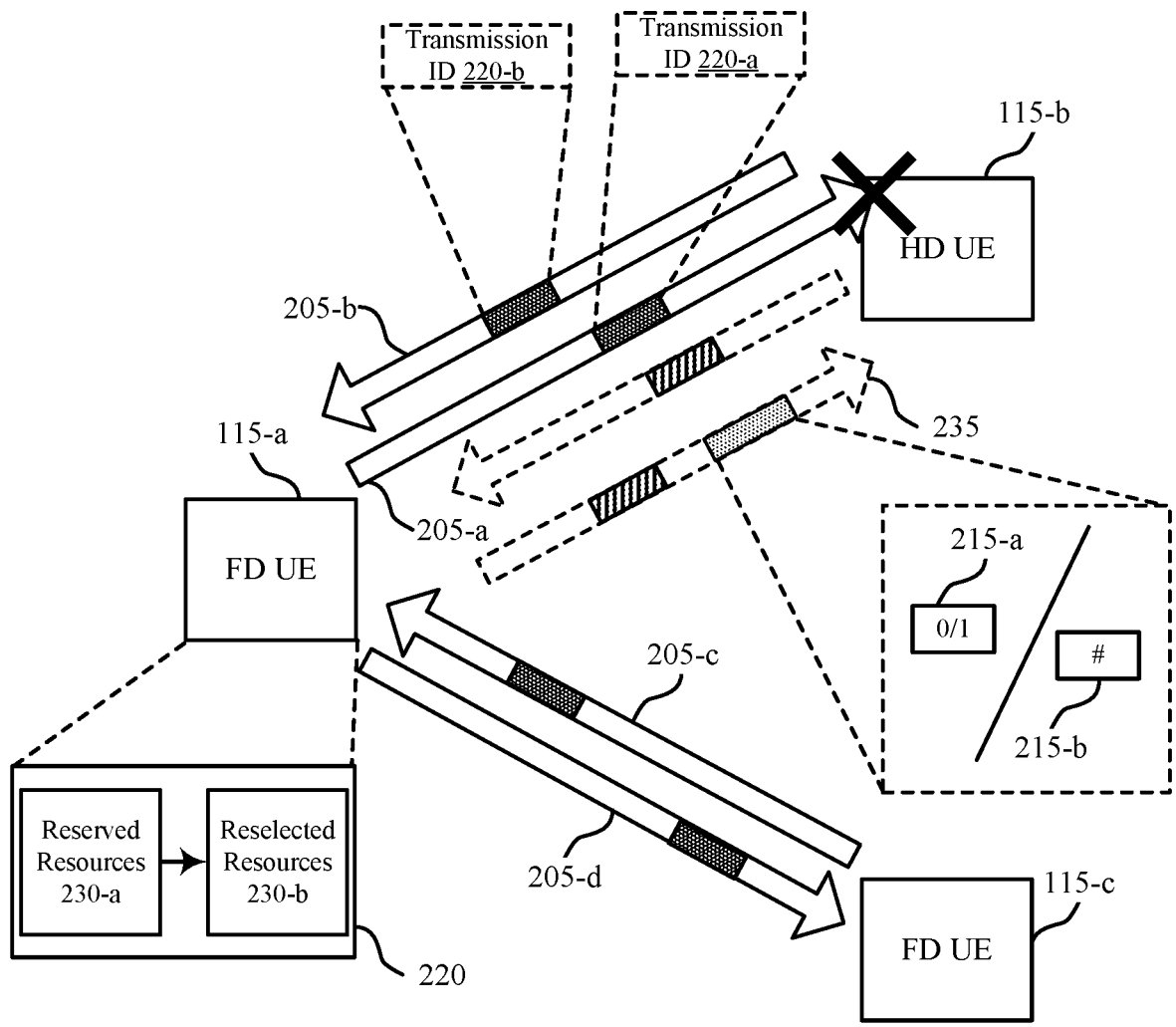
FIG. 2 illustrates an example of a wireless communications system that supports resource management techniques for full-duplex and half-duplex V2X in accordance with one or more aspects of the present disclosure.

FIG. 2 illustrates an example of a wireless communications system 200 that supports resource management techniques for full-duplex and half-duplex V2X systems in accordance with one or more aspects of the present disclosure. In some examples, wireless communications system 200 may implement aspects of wireless communications system 100. In some examples, the wireless communications system 200 may include a UE 115-*a*, a UE 115-*b*, and a UE 115-*c* which may be examples of UEs 115 and base stations 105, respectively, described with reference to FIG. 1. It is noted that communications between three UEs 115 are illustrated in wireless communications system 200 for the sake of brevity, and the techniques described herein may be applicable to single or multiple UEs 115 within a system. For instance, UE 115-*a* may communicate with UE 115-*b* and UE 115-*c* at a same time or at different times or may communicate with one or the other, for example. Further, sidelink communication techniques may be used for communication of wireless devices other than UEs, such as base station communications (e.g., wireless backhaul links between base stations or TRPs, etc.), communications between access points, and the like. One or more of UEs 115 may be implemented in a V2X system or the like and may be examples of vehicles, self-driving-vehicles, drones, or other wireless devices using sidelink communications, as described herein.

A UE 115-*a* may be enabled with full-duplex capabilities and may be referred to as a full-duplex UE. The full-duplex capabilities may include an ability to transmit and receive simultaneously. For example, the UE 115-*a* may transmit a sidelink transmission 205 to one or both of UE 115-*b* and UE 115-*c* and may receive a sidelink transmission 205 from UE 115-*d* or UE 115-*c* during a same time period. The UE 115-*c* may have similar capabilities and may also be referred to as a full-duplex UE.

The UE 115-*b* may be enabled with half-duplex capabilities and may be referred to as a half-duplex UE. The half-duplex capabilities may include an ability to transmit or receive at a time. For example, the UE 115-*c* may transmit a sidelink transmission 205-*b* to UE 115-*a* during a same time period that UE 115-*a* transmits the sidelink transmission 205-*a* to UE 115-*b*. The UE 115-*b* may not receive the sidelink transmission 205-*a* because it is operating in a transmit mode of the half-duplex capabilities. For example, when the UE 115-*b* operates in a transmit mode it may not operate in a receive mode. When the UE 115-*b* is not transmitting, it may operate in a receive mode (e.g., listening or monitoring for transmissions).

In some examples, the UE 115-*b*, which may be referred to as half-duplex UE 115-*b* that operates in a half-duplex mode, may transmit sidelink transmission 205-*b* including reservation information 210 during a same time period as the UE 115-*a*, which may be referred to as a full-duplex UE 115-*a* that operates in a full-duplex mode, transmits sidelink transmission 205-*a* including reservation information 210. For example, sidelink transmissions 205-*a* and 205-*b* may be transmitting in a same slot or other unit of time resource. The reservation information 210 in sidelink transmissions 205-*a* and 205-*b* may include a reservation for resources (e.g., frequency resources) during a same subsequent time period. For example, the concurrently transmitting half-duplex UE 115-*b* and full-duplex UE 115-*a* may both reserve frequency resources such as physical resource blocks for a same future time period such as a slot. In some cases, a portion of the reserved frequency resources may overlap which may cause a collision. The half-duplex UE 115-*b* may not receive the reservation information 210 in sidelink transmission 205-*a* and may not detect the collision. However, the full-duplex UE 115-*a* may be aware of the collision because the full-duplex UE 115-*a* was operating in the full-duplex mode with full-duplex capabilities when the sidelink transmissions 205-*a* and 205-*b* were sent.

In some cases, the reserved frequency resources of the reservation information 210 may not overlap but the half-duplex UE 115-*b* may not receive a subsequent transmission from the full-duplex UE 115-*a* during the reserved subsequent time period because the half-duplex UE 115-*b* may also transmit in the reserved subsequent time period (e.g., operate in a transmit mode during the time period) and may miss additional resource reservation information. The full-duplex UE 115-*a* may initiate a resource selection procedure to avoid such collisions.

For example, the full-duplex UE 115-*a* may receive the sidelink transmission 205-*b* and may determine an overlap of reserved resources 230-*a* in the subsequent time slot. The full-duplex UE 115-*a* may perform a resource selection procedure 220 to avoid the collision. For example, the full-duplex UE 115-*a* may select a new set of resources 230-*b* for the reservation. For example, the reelected resources 230-*b* may include an entirely new set of resource or may include a partially new set of resources for the reservation to avoid collision with the reserved resources indicated in the sidelink transmission 205-*b*. The full-duplex UE 115-*a* may transmit updated reservation information 215 for the subsequent sidelink transmission with the updated resource information and may transmit the updated reservation information 215 to the UE 115-*b* when the UE 115-*b* in operating in a receive mode 235. In such examples, the half-duplex UE 115-*b* may not be aware of the collision and thus may be agnostic to the selection procedure. In some cases, the reservation information 210 transmitted by the UE 115-*a* may include a transmission ID 220-*a* of the subsequent transmissions associated with the UE 115-*a* and the reservation information 210 transmitted by the UE 115-*b* may include a transmission ID 220-*b* associated with subsequent transmission of the UE 115-*b*. The transmission ID 220 may indicate a priority of the future transmissions. The reselection procedure may be performed by the full-duplex UE 115-*a* based on the transmission ID 220-*a* of the subsequent transmission (e.g., the priority of the subsequent transmission of the UE 115-*a*) being less than or equal to the transmission ID 220-*b* of the subsequent transmission associated with the half-duplex UE 115-*b* (e.g., the priority of the subsequent transmission of the UE 115-*b*). In some cases, the full-duplex UE 115-*a* will perform the selection procedure regardless of the transmission ID 220 of the subsequent transmissions.

In some examples, the full-duplex UE 115-*a* may transmit an indication 215 of the collision to the half-duplex UE 115-*b* requesting that the half-duplex UE perform the resource selection procedure when the UE 115-*b* in operating in a receive mode. In some cases, the indication may include a number 215-*b* of physical resource blocks, time slots, or other resources in which the collisions occur, or a one bit indication 215-*a* of a future collision, or the like. The half-duplex UE 115-*b* may receive the indication 215 and may select a new set of resources for the reservation or may select some new resources for the reservation to avoid collision with the subsequent transmission of the full-duplex UE 115-*a*. The half-duplex UE 115-*b* may then update the reservation information 210 with the updated resource information and may transmit the updated reservation information 215 to the full-duplex UE 115-*a*.

In some examples, the full-duplex UE 115-*a* may transmit a sidelink transmission 205-*d* to a second full-duplex UE 115-*c* during a same time period that UE 115-*c* transmits sidelink transmission 205-*c* to full-duplex UE 115-*a*. The sidelink transmissions 205-*c* and 205-*d* may include reservation information 210 for subsequent transmissions by the UE 115-*a* and UE 115-*c* for a same future time period. The reservation information may include the reserved frequency resources which may overlap and may cause a collision during the reserved time period. In some cases, the reserved frequency resources may not overlap but, in some situations, the full-duplex UE 115-*c* may not receive a transmission from the full-duplex UE 115-*a* that is transmitted during the future reserved time resources (e.g., situations where the full-duplex UE 115-*c* may have reduced full-duplex capability as described herein). full-duplex UE 115-*a* or full-duplex UE 115-*c*, or both may initiate a resource selection procedure to avoid the collision and ensure reliable decoding.

For example, the full-duplex UE 115-*a* and the full-duplex UE 115-*c* may receive the sidelink transmissions 205-*c* and 205-*d* respectively, and may decode the reservation information 210 received from the other full-duplex UE. One or both of the UEs 115-*a* and 115-*c* may infer a resource collision during the future time slot based on the received reservation information 210. Additionally, one or both of the full-duplex UEs 115-*a* and 115-*c* may measure an SNR based on the received transmission and may determine that decoding may be unreliable. In some cases, the full-duplex UE 115-*a* or 115-*c*, or both may identify priorities associated with the subsequent future transmissions and may perform a resource selection procedure based on one priority being lower or higher than the other. In some cases, the selection procedure may include selecting a new or partially new set of resources for reservation. In some cases, the priority of the full-duplex UEs 115-*a* and 115-*c* may be equal and the full-duplex UE 115-*a* or 115-*c* with a lower transmit ID may reselect a new or partially new set of resources for reservation. In some cases, both full-duplex UEs 115-*a* and 115-*c* may reselect a partially new set of resources. For example, the full-duplex UE 115 with a higher transmission priority may select odd-numbered resources of the set of reserved resources and the full-duplex UE with a higher transmission priority may select even-numbered resources of the set of reserved resources, or vice versa. In some cases, one full-duplex UE 115 (e.g., the full-duplex UE 115 with the higher or lower transmission priority, the higher or lower transmission ID, or the like) may transmit explicit signaling to the other full-duplex UE 115 requesting a selection procedure or indicating that the full-duplex UE 115 that transmitted the indication will perform the selection procedure. For example, the other full-duplex UE may receive an indication to select odd-numbered resources or even-numbered resources of the set of reserved resources, or a new set of resources or may receive an indication that the transmitting full-duplex UE will select odd-numbered resources or even-numbered resources of the set of reserved resources, or a new set of resources. In such cases, a UE 115 may perform a resource selection procedure to avoid collision during a future time period.

Figure 3A:
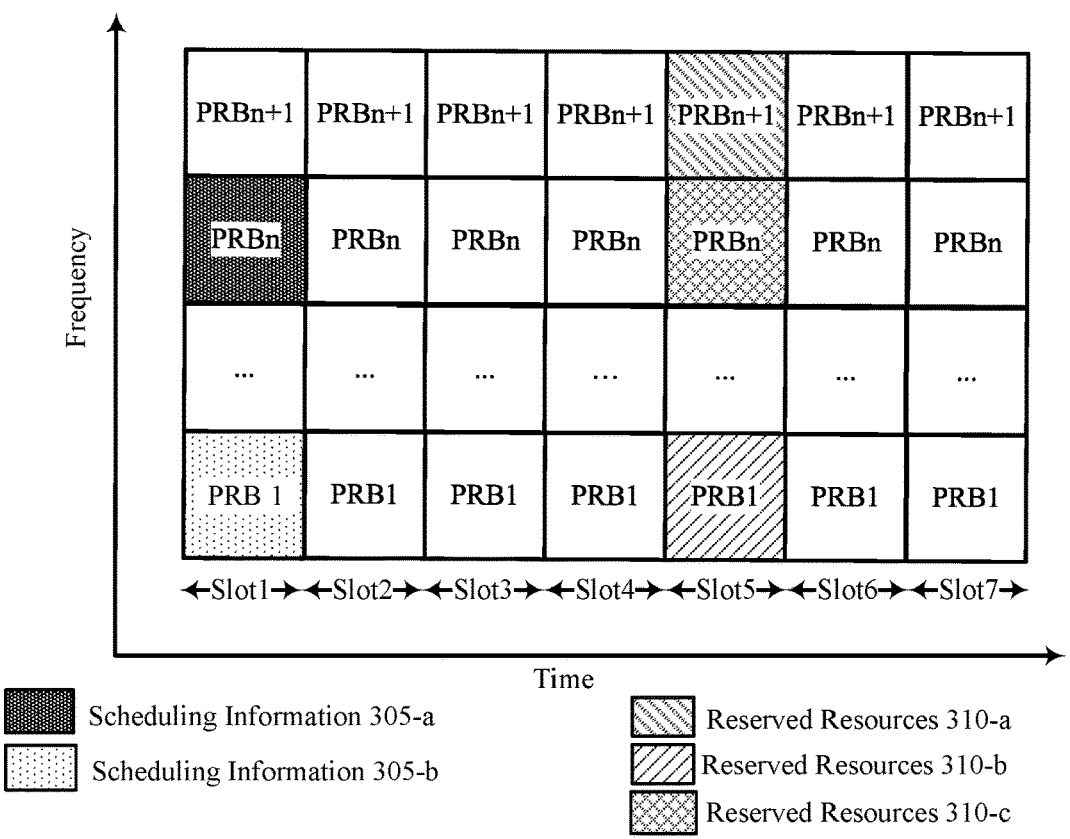
FIGS. 3A and 3B illustrate examples of a resource structure that supports resource management techniques for full-duplex and half-duplex V2X systems in accordance with one or more aspects of the present disclosure.
Figure 3B:
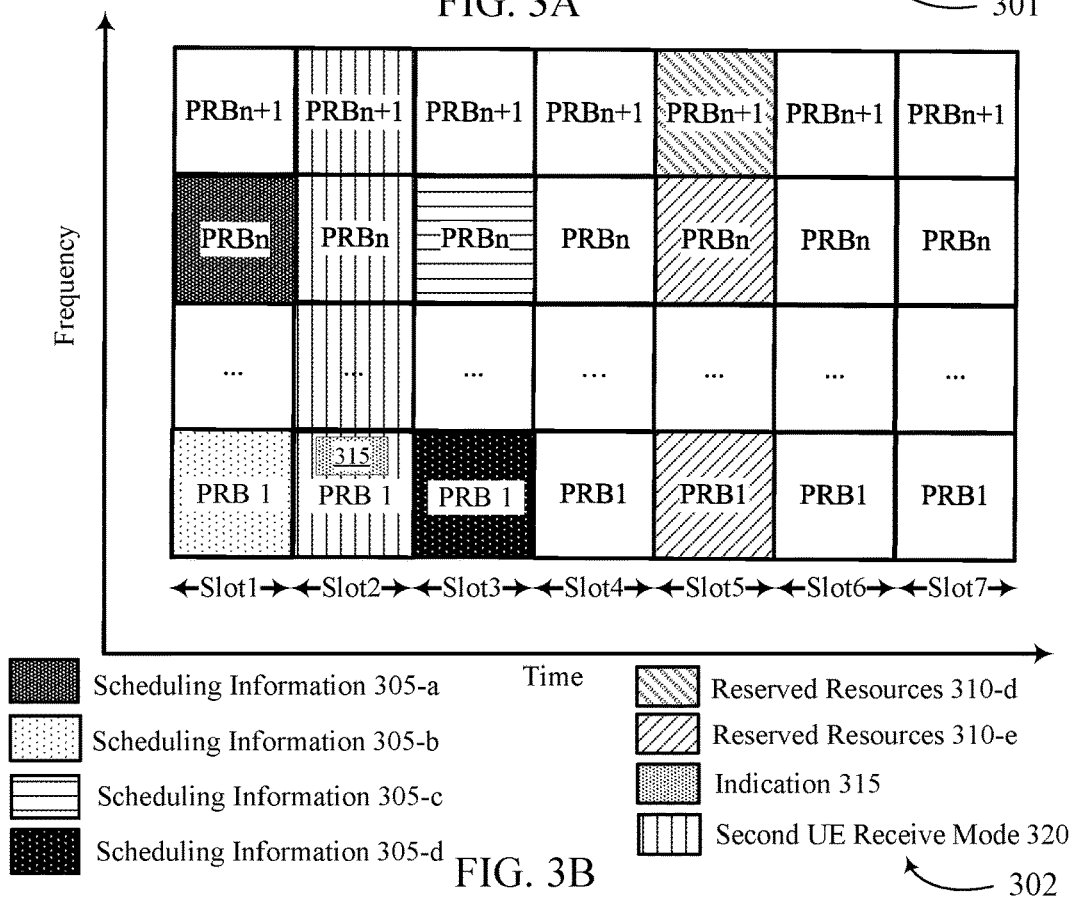

FIGS. 3A and 3B illustrate examples of resource structures 301 and 302 that supports resource management techniques for full-duplex and half-duplex V2X systems in accordance with one or more aspects of the present disclosure. In some examples, resource structure 301 and 302 may implement aspects of wireless communications system 100 and wireless communications system 200.

Resource structures 301 and 302 may illustrate aspects of resource selection before, during, and after a resource selection (e.g., reselection procedure). As described in FIG. 2, a UE may select and reserve resources for transmission in a wireless communications system (e.g., a V2X system). In some cases, the UE may select resources for transmission that overlap with resources selected by another UE.

Based on a number of factors, the UE may determine to reselect reservation resources for a future subsequent transmission. For example, a first UE may transmit control channel information including scheduling information 305-*a* and a second UE may transmit control channel information including scheduling information 305-*b* in slot1 and may both reserve resources 310 for a subsequent slot, for example, one or more physical resource blocks (PRB) in slot5. Slot5 may include PRB1 through PRBn+1. In some examples, the first UE may reserve a first set of PRBs 310-*a* in slot5 and the second UE may reserve a second set of PRBs 310-*b* in slot5. In some examples, reserved resources 310-*c* may include one or more of PRB 1 though PRBn+1 that may be reserved by both the first and second UE which may cause a collision.

In some cases, the first UE may determine that one or more of the PRB 1 though PRBn+1 are reserved by the first UE and the second UE, as described with reference to FIG. 2 (e.g., reserved resources 310-*c*). Then one of the UE may reselect resources 310 based on determining that one or more of the frequency resources overlap. In some cases, the first UE may select a new set of PRB 310-*e* that were not previously reserved by the first UE. For example, the first UE may initially reserve PRBs 1, 2, 5, and 8 in slot 5 and the second UE may reserve PRB 2, 4, and n+1 in slot5. The first UE may reselect a new set that is different than the previously reserved resources, e.g., PRB 3, 6, and n. In some cases, the UE may select a partially new set of resources. For example, the first UE may select PRB 1, 3, and 5. In some cases, the first UE may request that the second UE perform the resource selection procedure. For example, the first UE may transmit an indication 315 while the second UE is inn a receive mode 320. In such cases, the second UE may select new resources similarly to the example provided above (not shown) based on receiving the indication. The UE that performs the reselection process may transmit an updated SCI (e.g., scheduling information 305-*c* or 305-*d*) indicating the newly chosen resources.

In some cases, the first UE may select odd resource of the reserved resources and may indicate to the second UE to select even resources of the set of reserved resources. For example, continuing the previous example, the first may reselect PRB 1, 5, and n+1 and the second UE may reselect resources 2, 4 and 8, or vice versa In some cases, the reselection is performed based on a priority associated with the subsequent transmissions of the UE, a transmission ID associated with the subsequent transmission, a measure SNR at the UE, a subchannel ID, or the like.

Figure 4:
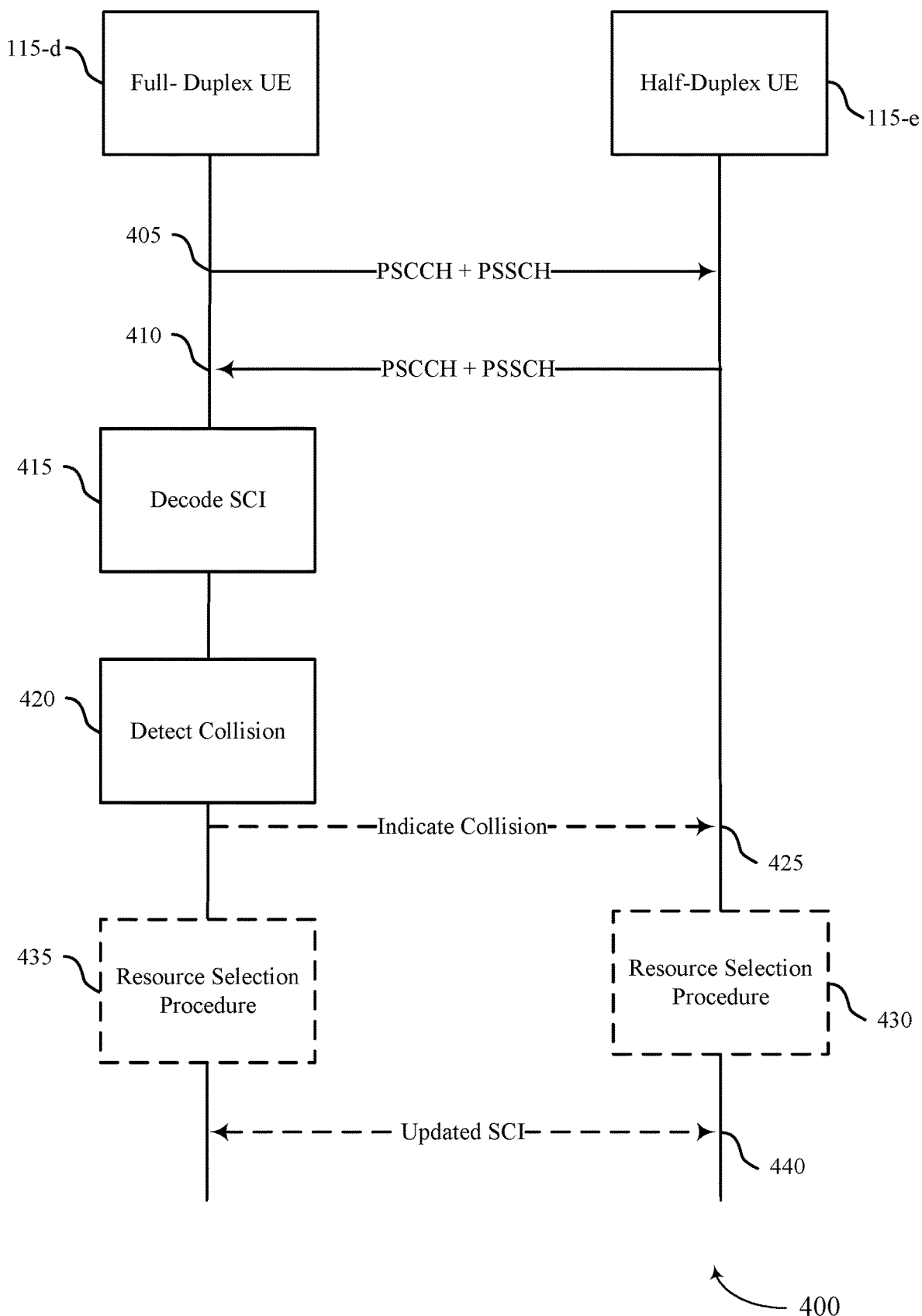
FIG. 4 illustrates an example of a process flow that supports resource management techniques for full-duplex and half-duplex V2X systems in accordance with one or more aspects of the present disclosure.

FIG. 4 illustrates an example of a process flow 400 that supports resource management techniques for full-duplex and half-duplex V2X systems in accordance with one or more aspects of the present disclosure. In some examples, process flow 400 may implement aspects of wireless communications system 100 and wireless communications system 200. Process flow 400 may be implemented by UE 115-*d*, UE 115-*e*, or any other examples of UEs 115 as described herein. Alternative examples of the following may be implemented, where some steps are performed in a different order than described or are not performed at all. In some cases, steps may include additional features not mentioned below, or further steps may be added.

At 405, full-duplex UE 115-*d* may transmit a sidelink control channel or a sidelink data channel or both to the half-duplex UE 115-*e* on a set of resources (e.g., subchannels/PRBs). For example, the full-duplex UE 115-*d* may transmit PSCCH and PSSCH to the half-duplex UE 115-*e* which may include a first SCI for the full-duplex UE 115-*d*. The first SCI may include resource reservation information that indicates resources during a time period that are reserved by the UE 115-*d* for a first subsequent sidelink data channel transmission. The half-duplex UE 115-*e* may not receive the first SCI for UE 115-*d* transmitted on the set of resources because, at 410, the half-duplex UE 115-*e* may concurrently transmit PSCCH and PSSCH to the full-duplex UE 115-*d* on the same set of resources including a second SCI for the UE 115-*e*. The second SCI may include resource reservation information that indicates resources during the same time period that are reserved by the UE 115-*e* for a second subsequent sidelink data channel transmission. The full-duplex UE 115-*d* may receive the second SCI for half-duplex UE 115-*e* transmitted on the set of resources. Thus, the full-duplex UE 115-*d* and the half-duplex UE 115-*e* may transmit control information and/or data concurrently and on the same set of resources but the full-duplex UE 115-*d* may receive the second SCI while the half-duplex UE 115-*e* may not receive the first SCI.

At 415 the full-duplex UE 115-*d* may decode the received SCI and may identify resource reservation information for the UE 115-*e* as well as transmission priority information for the first subsequent data transmission and the second subsequent data transmission. At 420, the UE 115-*d* may determine that the resources reserved by the UE 115-*e* in the second SCI overlap with the resources the UE 115-*d* reserved in the first SCI and may infer or determine that a collision will occur.

At 425, the full-duplex UE 115-*d* may transmit an indication of the collision to the half-duplex UE 115-*e* requesting that the half-duplex UE 115-*e* perform a resource selection procedure. In some cases, the indication may be quantized. For example, the indication may include information about the collision like, for example, how many PRBs collide, which PRBs collide, which time slots include a collision, or an indication of other resources in which the collisions occur. In some examples, the indication is one bit indicating that a collision is scheduled to occur during the future time period. The full-duplex UE 115-*d* may transmit during a time period that the half-duplex UE 115-*e* is listening (e.g., not transmitting, operating in a receive mode, or the like) and the half-duplex UE 115-*e* may receive the indication. In some cases, the collision indication is transmitted by the full-duplex UE 115-*d* based on the transmission priority of the first subsequent data channel transmission being greater than or equal to the second subsequent data channel transmission. In some cases, the full-duplex UE 115-*d* will transmit the collision indication regardless of future transmission priorities.

At 430, the half-duplex UE 115-*e* may select a new set of resources for the reservation or may select some new resources (e.g., a partially new set of resources) for the reservation to avoid collision with the full-duplex UE 115-*d* based on receiving the indication. The half-duplex UE 115-*e* may update its SCI at 440 with the updated resource reservation information based on performing the resource selection procedure and may transmit the updated SCI to the full-duplex UE 115-*d*.

At 435, the full-duplex UE 115-*d* may detect and avoid the collision by performing the resource selection procedure. For example, the full-duplex UE 115-*d* may select a new set of resources for the reservation or may select some new resources for the first subsequent data channel transmission to avoid collision with the second subsequent data channel transmission. At 440, the full-duplex UE 115-*d* may update its SCI with the updated resource reservation information and may transmit the updated SCI to the half-duplex UE 115-*e*. In such examples, the half-duplex UE 115-*e* may not be aware of the collision and thus be agnostic to the selection procedure. In some cases, the reselection is performed by the full-duplex UE 115-*d* based on the transmission priority of the first subsequent data channel transmission being less than or equal to the second subsequent data channel transmission. In some cases, the full-duplex UE 115-*d* will perform the selection procedure regardless of future transmission priorities.

Figure 5:
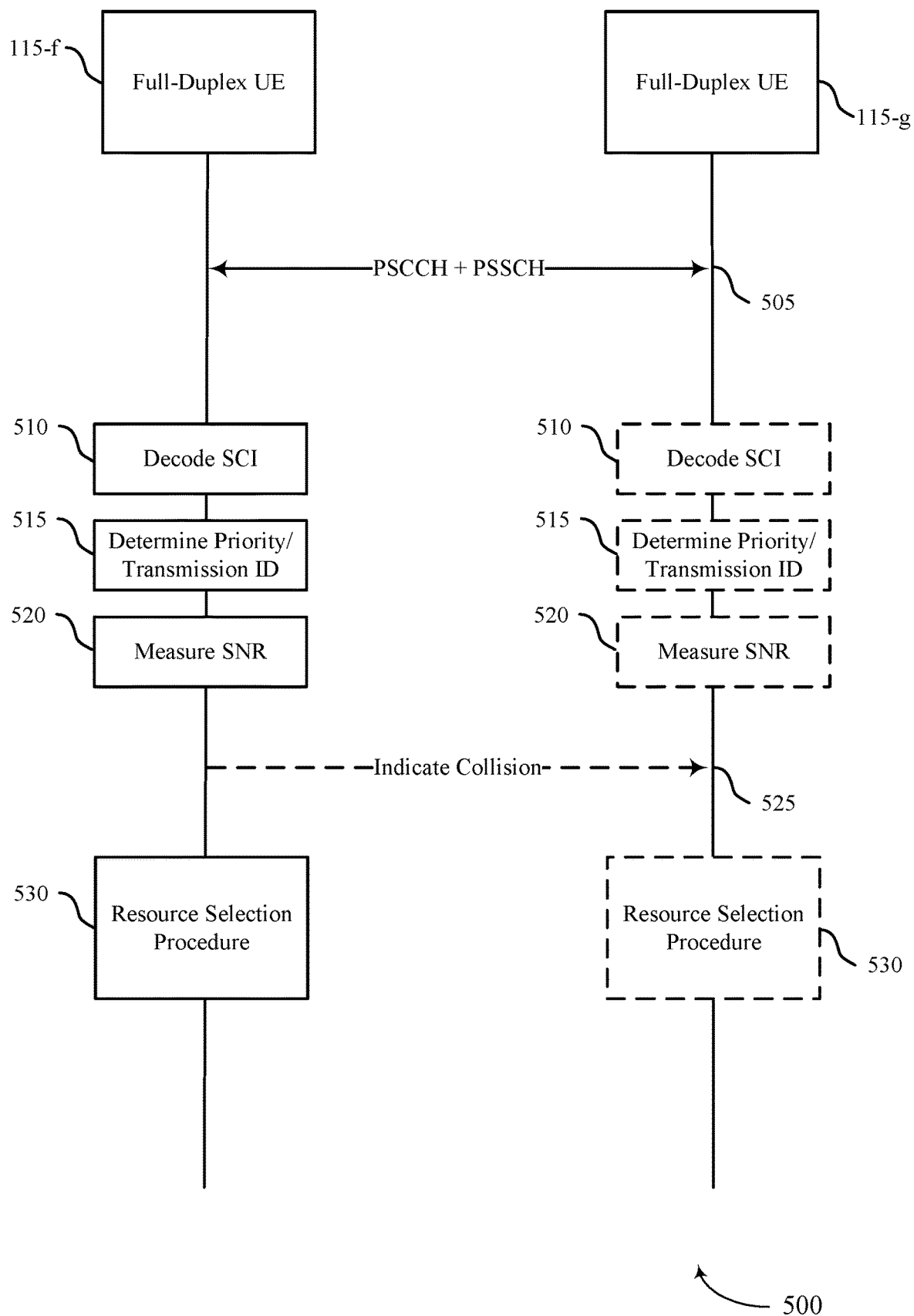
FIG. 5 illustrates an example of a process flow that supports resource management techniques for full-duplex and half-duplex V2X systems in accordance with one or more aspects of the present disclosure.

FIG. 5 illustrates an example of a process flow 500 that supports resource management techniques for full-duplex and half-duplex V2X systems in accordance with one or more aspects of the present disclosure. In some examples, process flow 500 may implement aspects of wireless communications system 100 or wireless communications system 200. Process flow 500 may be implemented by UE 115-*f*, UE 115-*g*, or any other examples of UEs 115 as described herein. Alternative examples of the following may be implemented, where some steps are performed in a different order than described or are not performed at all. In some cases, steps may include additional features not mentioned below, or further steps may be added.

At 505, full-duplex UE **115-*f* may transmit a sidelink control channel or a sidelink data channel or both to the full-duplex UE 115-*g* on a set of resources (e.g., subchannels/PRBs). For example, the full-duplex UE 115-*f* may transmit PSCCH and PSSCH to the full-duplex UE 115-*g* which may include a first SCI for the full-duplex UE 115-*f*. The first SCI may include resource reservation information that indicates resources during a time period that are reserved by the UE 115-*f* for a first subsequent sidelink data channel transmission. The full-duplex UE 115-*g* may receive the first SCI for UE 115-*f* transmitted on the set of resources and, may concurrently transmit PSCCH and PSSCH to the full-duplex UE 115-*f* on the same set of resources including a second SCI for the UE 115-*g*. The second SCI may include resource reservation information that indicates resources during the same time period that are reserved by the UE 115-*g* for a second subsequent sidelink data channel transmission. The full-duplex UE 115-*f* may receive the second SCI for full-duplex UE 115-*g* transmitted on the set of resources. Thus, the full-duplex UE 115-*f* and the full-duplex UE 115-*g*** may transmit and receive control information and/or data concurrently and on the same set of resources.

At 510, the full-duplex UE **115-*f* and the UE 115-*g* may decode the receive SCI and may identify resource reservation information for the UE 115-*g* and the UE 115-*f* respectively. The UE 115-*f* may determine that the resources reserved by the UE 115-*g* in the second SCI overlap with the resources the UE 115-*f* reserved in the first SCI and may infer or determine that a collision will occur or vice versa. At 515, the UE 115-*f* may determine a transmission priority associated with the second subsequent sidelink data channel transmission and may determine that it is higher than, lower than or equal to a transmission priority associated with the first subsequent data channel transmission. Additionally or alternatively, the UE 115-*g* may determine a transmission priority associated with the first subsequent sidelink data channel transmission and may determine that it is higher than, lower than or equal to a transmission priority associated with the second subsequent data channel transmission. In some cases, the transmission priorities may be equal and the UE 115-*f* may further determine that a transmission ID associated with the second subsequent data channel transmission is higher or lower than a transmission ID associated with the first subsequent data channel transmission or the UE 115-*g*** may further determine that a transmission ID associated with the first subsequent data channel transmission is higher or lower than a transmission ID associated with the second subsequent data channel transmission, or both.

At 520, the UE **115-*f* and the UE 115-*g* may each measure the SNR of the received PSCCH and PSSCH and the UE 115-*f* and the UE 115-*g*, or both may determine that the corresponding SNR satisfies a threshold. For example, the UE 115-*f* or the UE 115-*g*, or both may determine that the SNR is too low or too high for reliable decoding. In some cases, the UE 115-*f* or the UE 115-*g***, or both may determine that the SNR does not satisfy a threshold.

In some cases, at 525, the UE **115-*f* may transmit an indication of the collision to the UE 115-*g*. For example. UE 115-*f* may determine that the transmission priority associated with the first subsequent data channel transmission is lower than the transmission priority associated with the second subsequent data channel transmission and may transmit an indication (e.g., explicit signaling) that it will perform a resource selection procedure to the UE 115-*g*. The UE 115-*f* may indicate that it will select a new set of resources or a partially new set of resources that include some of the previously reserved resources. In cases where the UE 115-*f* will select a partially new set of resources, the UE 115-*g* may also select a partial new set of resources based on the indication to avoid the collision. For example, the UE 115-*f* may indicate that it will select odd numbered resources of the set of reserved resources and based on the indication, the UE 115-*f* may select even numbered resources of the set of reserved resources, or vice versa. In some cases, the UE 115-*f*** may transmit the indication when it determines that the transmission priority associated with the first subsequent data channel transmission is higher than the transmission priority associated with the second subsequent data channel transmission.

In some examples, the UE **115-*f* may determine that the transmission priority associated with the first subsequent data channel transmission may be higher than the transmission priority associated with the second subsequent data channel transmission and may transmit a collision indicate that explicitly requests that the UE 115-*g* perform a selection procedure. For example, the UE 115-*f* may request that the UE 115-*g* select a new set of resources or a partially new set of resources that include some of the previously reserved resources to avoid the collision. In cases where the UE 115-*g* is indicated to select a partially new set of resources, the UE 115-*f* may also selects a partial new set of resources based on the indication. For example, the UE 115-*f* may indicate to the UE 115-*g* to select odd resources of the set of reserved resources and based on the indication, the UE 115-*f* may select even resources of the set of reserved resources, or vice versa. In some cases, the UE 115-*f*** may transmit the request when it determines that the transmission priority associated with the first subsequent data channel transmission is lower than the transmission priority associated with the second subsequent data channel transmission.

In some examples, the UE **115-*f* may determine that the transmission priority associated with the first subsequent data channel transmission may be equal to the transmission priority associated with the second subsequent data channel transmission and may transmit the collision indication to the other UE 115-*g* requesting that the UE 115-*g* perform a selection procedure or indicating that the UE 115-*f*** will perform the selection procedure based on determining that the transmission ID associated with the second subsequent data channel transmission is higher or lower than a transmission ID associated with the first subsequent data channel transmission.

At 530, the UE **115-*f* may perform the resource selection procedure. For example, the UE 115-*f* may determine at 515 that the transmission priority associated with the first subsequent data channel transmission is lower than the transmission priority associated with the second subsequent data channel transmission and may select a new set of resources to avoid collision with the reserved resources for the second subsequent data channel transmission. In such cases, the UE 115-*g* may transmit the second subsequent data channel transmission on the resources reserved in the second SCI. In some cases, the UE 115-*g*** may determine that the transmission priority associated with the second subsequent data channel transmission is lower than the transmission priority associated with the first subsequent data channel transmission and may alternatively select a new set of resources to avoid collision with the reserved resources for the first subsequent data channel transmission.

In some examples, at 530, the UE with the lower priority (e.g., UE **115-*f* or UE 115-*g*) may select a partially new set of resources along with some of the previously reserved resources. For example, UE 115**-*f* or the UE 115-*g* may determine that one or more resource blocks reserved by the first SCI overlap with one or more resource blocks reserved by the second SCI and may reselect the resource blocks that overlap while keeping the reserved resource blocks that did not overlap. In some cases, the reselection process is performed based on the measured SNR of the UE 115-*f* or the UE 115-*g* satisfying a threshold (e.g., the SNR is too high or too low for reliable decoding). For example, the SNR measured at the UE 115-*g* may satisfy the threshold and the UE 115-*g* may determine to perform the reselection process to avoid the collision.

In some examples, at 530, the UEs 115 may have a same priority and may perform a reselection process based on the transmission ID of the first and second subsequent data channel transmissions. For example, the UE 115-*f* may determine at 515 that the transmission ID associated with the first subsequent data channel transmission is lower than the transmission ID associated with the second subsequent data channel transmission and may select a new set of resources to avoid collision with the reserved resources for the second subsequent data channel transmission, or vice versa. In some examples, the associated with the lower transmission ID may select a partially new set of resources. In some cases, the resources that are retained and the resources that are reselected may be random per UE. In some cases, the resources that are retained and the resources that are reselected may be based on the number of the resource being odd or even. For example, the UE 115 associated with the higher transmission ID may reselect odd-numbered resources while UE 115 associated with the lower transmission ID reselects even numbered resources, or vice versa. In some examples, such reselection may be based on the transmission priority associated with the UE 115.

Figure 6:
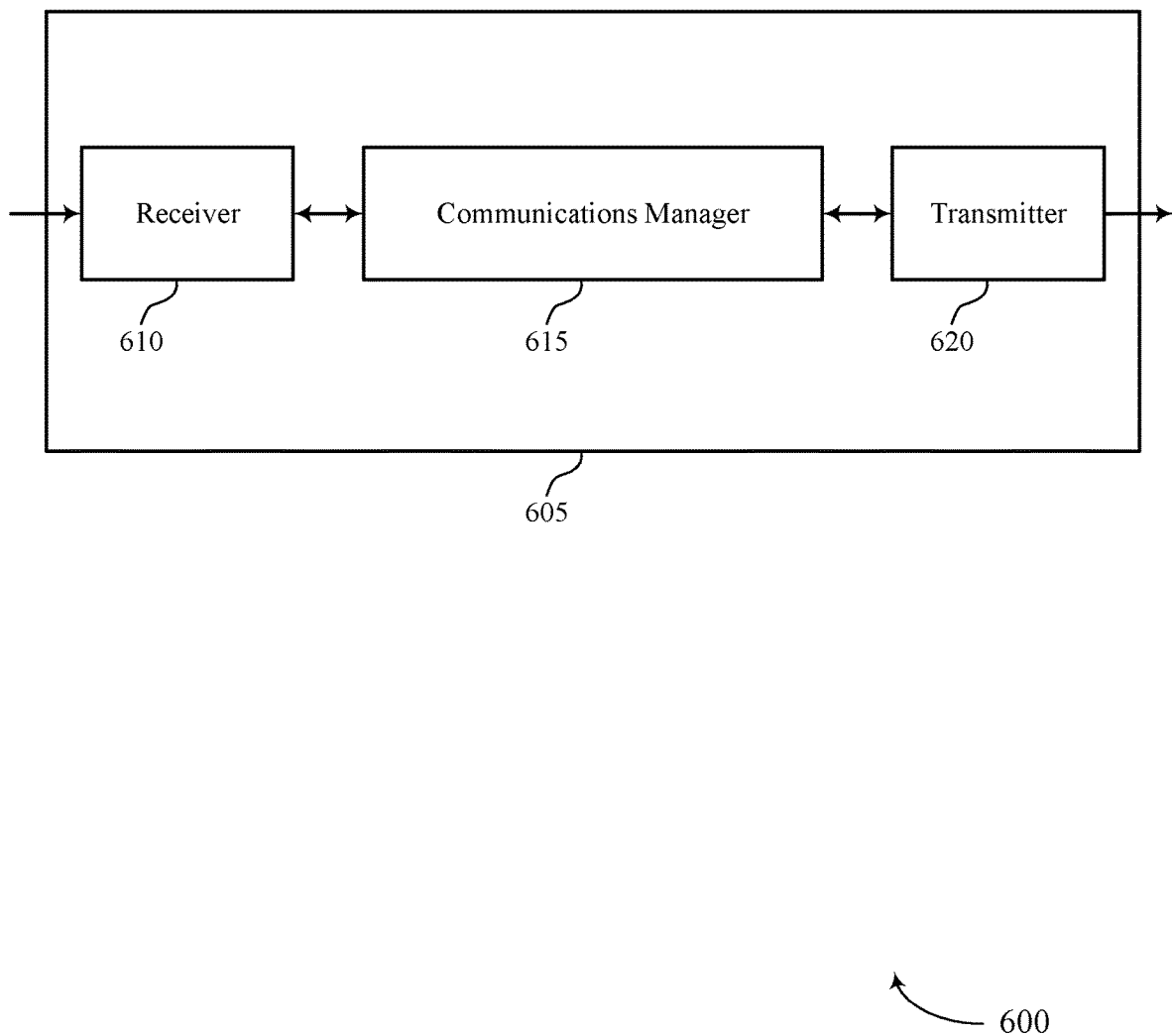
FIGS. 6 and 7 show block diagrams of devices that support resource management techniques for full-duplex and half-duplex V2X systems in accordance with one or more aspects of the present disclosure.

FIG. 6 shows a block diagram 600 of a device 605 that supports resource management techniques for full-duplex and half-duplex V2X systems in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to resource management techniques for full-duplex and half-duplex V2X systems, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit a first sidelink control channel during a set of time resources, the first sidelink control channel including scheduling information for transmission of a first sidelink data channel by the device via a first set of time-frequency resources, receive, from a second device, a second sidelink control channel during the set of time resources, the second sidelink control channel including scheduling information for transmission of a second sidelink data channel by the second device via a second set of time-frequency resources, determine that the first set of time-frequency resources and the second set of time-frequency resources at least partially overlap, and perform a resource selection procedure based on determining that the first set of time-frequency resources and the second set of time-frequency resources at least partially overlap. The communications manager 615 may be an example of aspects of the communications manager 910 described herein.

The actions performed by the communications manager 615 as described herein may be implemented to realize one or more potential implementations. One implementation may allow a UE 115 to save power and increase battery life by determining that the first set of time-frequency resources and the second set of time-frequency resources at least partially overlap before performing a resource selection procedure. Another implementation may provide improved quality and reliability of service at the UE 115, as throughput may be increased and resources collisions may be avoided.

The communications manager 615 may be an example of means for performing various aspects of managing sidelink resources for full-duplex and half-duplex devices in V2X systems as described herein. The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), an FPGA or other programmable logic device.

In some examples, the communications manager 615 may be configured to perform various operations (e.g., receiving, determining, transmitting, selecting, performing) using or otherwise in cooperation with the receiver 610, the transmitter 620, or both.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
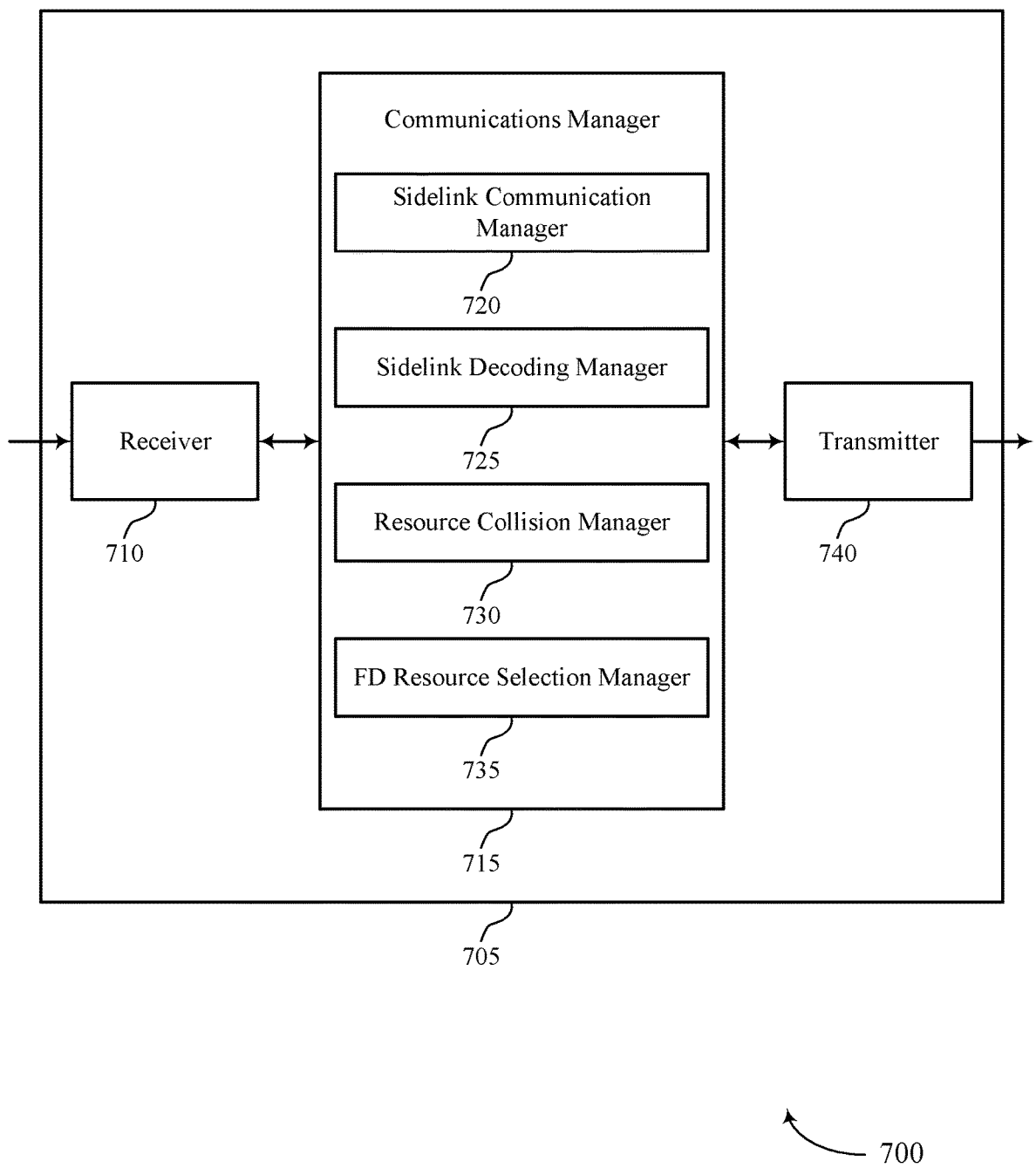

FIG. 7 shows a block diagram 700 of a device 705 that supports resource management techniques for full-duplex and half-duplex V2X systems in accordance with one or more aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to resource management techniques for full-duplex and half-duplex V2X systems, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a sidelink communication manager 720, a sidelink decoding manager 725, a resource collision manager 730, and a full-duplex resource selection manager 735. The communications manager 715 may be an example of aspects of the communications manager 910 described herein.

The sidelink communication manager 720 may transmit a first sidelink control channel during a set of time resources, the first sidelink control channel including scheduling information for transmission of a first sidelink data channel by the device via a first set of time-frequency resources.

The sidelink decoding manager 725 may receive, from a second device, a second sidelink control channel during the set of time resources, the second sidelink control channel including scheduling information for transmission of a second sidelink data channel by the second device via a second set of time-frequency resources.

The resource collision manager 730 may determine that the first set of time-frequency resources and the second set of time-frequency resources at least partially overlap.

The full-duplex resource selection manager 735 may perform a resource selection procedure based on determining that the first set of time-frequency resources and the second set of time-frequency resources at least partially overlap.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
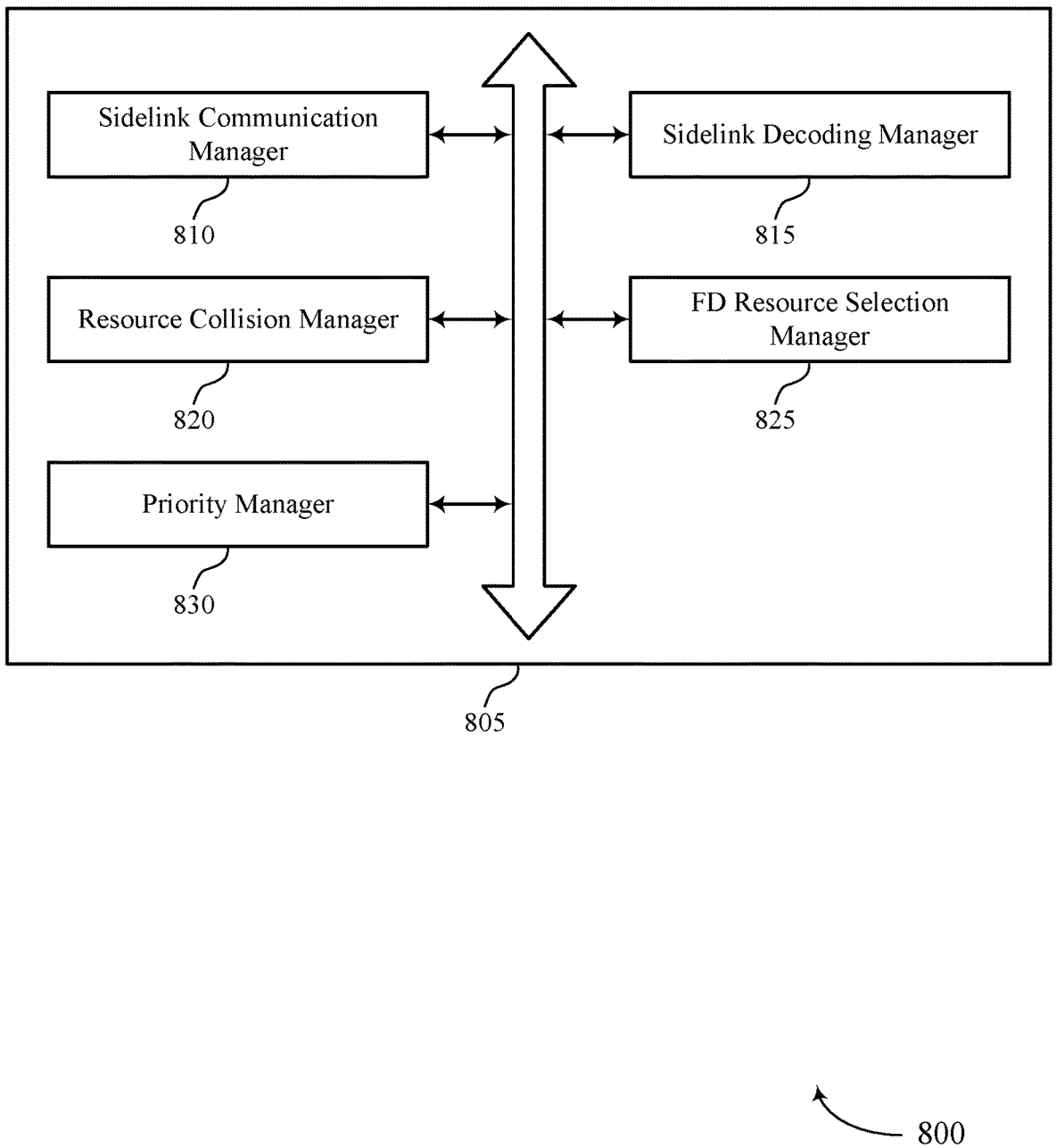
FIG. 8 shows a block diagram of a communications manager that supports resource management techniques for full-duplex and half-duplex V2X systems in accordance with one or more aspects of the present disclosure.

FIG. 8 shows a block diagram 800 of a communications manager 805 that supports resource management techniques for full-duplex and half-duplex V2X systems in accordance with one or more aspects of the present disclosure. The communications manager 805 may be an example of aspects of a communications manager 615, a communications manager 715, or a communications manager 910 described herein. The communications manager 805 may include a sidelink communication manager 810, a sidelink decoding manager 815, a resource collision manager 820, a full-duplex resource selection manager 825, and a priority manager 830. Each of these modules may communicate, directly or indirectly, with one another (e.g., via one or more buses).

The sidelink communication manager 810 may transmit a first sidelink control channel during a set of time resources, the first sidelink control channel including scheduling information for transmission of a first sidelink data channel by the device via a first set of time-frequency resources.

In some examples, the sidelink communication manager 810 may transmit, to the second device, an updated sidelink control channel including updated scheduling information for transmission of the first sidelink data channel by the device via the third set of time-frequency resources.

In some examples, the sidelink communication manager 810 may transmit, to the second device, an indication that the first set of time-frequency resources and the second set of time-frequency resources at least partially overlap.

In some examples, the sidelink communication manager 810 may transmit, to the second device, a request for the second device to select a third set of time-frequency resources.

In some cases, the indication is transmitted during a period of time in which the second device is operating in a receive mode.

The sidelink decoding manager 815 may receive, from a second device, a second sidelink control channel during the set of time resources, the second sidelink control channel including scheduling information for transmission of a second sidelink data channel by the second device via a second set of time-frequency resources.

In some examples, the sidelink decoding manager 815 may determine that a signal-to-noise ratio of the received second sidelink control channel satisfies a threshold.

In some examples, the sidelink decoding manager 815 may receive, from the second device, an updated sidelink control channel including updated scheduling information for transmission of the second sidelink data channel by the second device via a third set of time-frequency resources.

The resource collision manager 820 may determine that the first set of time-frequency resources and the second set of time-frequency resources at least partially overlap.

In some cases, the indication indicates physical resource blocks or time slots, or both, in which the first set of time-frequency resources and the second set of time-frequency resources overlap.

In some cases, the indication includes a single bit indication that indicates the first set of time-frequency resources and the second set of time-frequency resources at least partially overlap.

In some cases, the indication includes a number of resources in which the first set of time-frequency resources and the second set of time-frequency resources overlap.

The full-duplex resource selection manager 825 may perform a resource selection procedure based on determining that the first set of time-frequency resources and the second set of time-frequency resources at least partially overlap.

In some examples, the full-duplex resource selection manager 825 may select a third set of time-frequency resources that is different from the second set of time-frequency resources.

In some examples, selecting a third set of time-frequency resources that is different from the second set of time-frequency resources, where the third set of time-frequency resources includes a subset of the first set of time-frequency resources based on the signal-to-noise ratio of the received second sidelink control channel satisfying the threshold.

In some examples, the full-duplex resource selection manager 825 may select a third set of time-frequency resources that is different from the second set of time-frequency resources based on the determining that the second transmission identifier associated with the second sidelink data channel is greater than the first transmission identifier associated with the first sidelink data channel.

In some examples, the full-duplex resource selection manager 825 may select a third set of frequency resources including resources at least a portion of the first set of time-frequency resources and the second set of time-frequency resources.

In some examples, the full-duplex resource selection manager 825 may select a third set of time-frequency resources.

In some examples, the full-duplex resource selection manager 825 may transmit, to the second device, signaling indicating selection of a third set of time-frequency resources by the device.

In some cases, the subset of the first set of time-frequency resources includes at least a portion of time-frequency resources that are different from the second set of time-frequency resources.

In some cases, the third set of frequency resources are randomly selected.

In some cases, the third set of time-frequency resources includes odd numbered resources of the first set of time-frequency resources and the second set of time-frequency resources.

In some cases, the third set of time-frequency resources includes even numbered resources of the first set of time-frequency resources and the second set of time-frequency resources.

In some cases, the third set of time-frequency resources includes resources different than the first set of time-frequency resources and the second set of time-frequency resources.

The priority manager 830 may determine a priority associated with the second sidelink data channel is greater than a priority associated with the first sidelink data channel.

In some examples, the priority manager 830 may determine a priority associated with the second sidelink data channel and a priority associated with the first sidelink data channel are the same.

In some examples, the priority manager 830 may determine a second transmission identifier associated with the second sidelink data channel is greater than a first transmission identifier associated with the first sidelink data channel.

In some examples, the priority manager 830 may determine a second transmission identifier associated with the second sidelink data channel is less than a first transmission identifier associated with the first sidelink data channel.

Figure 9:
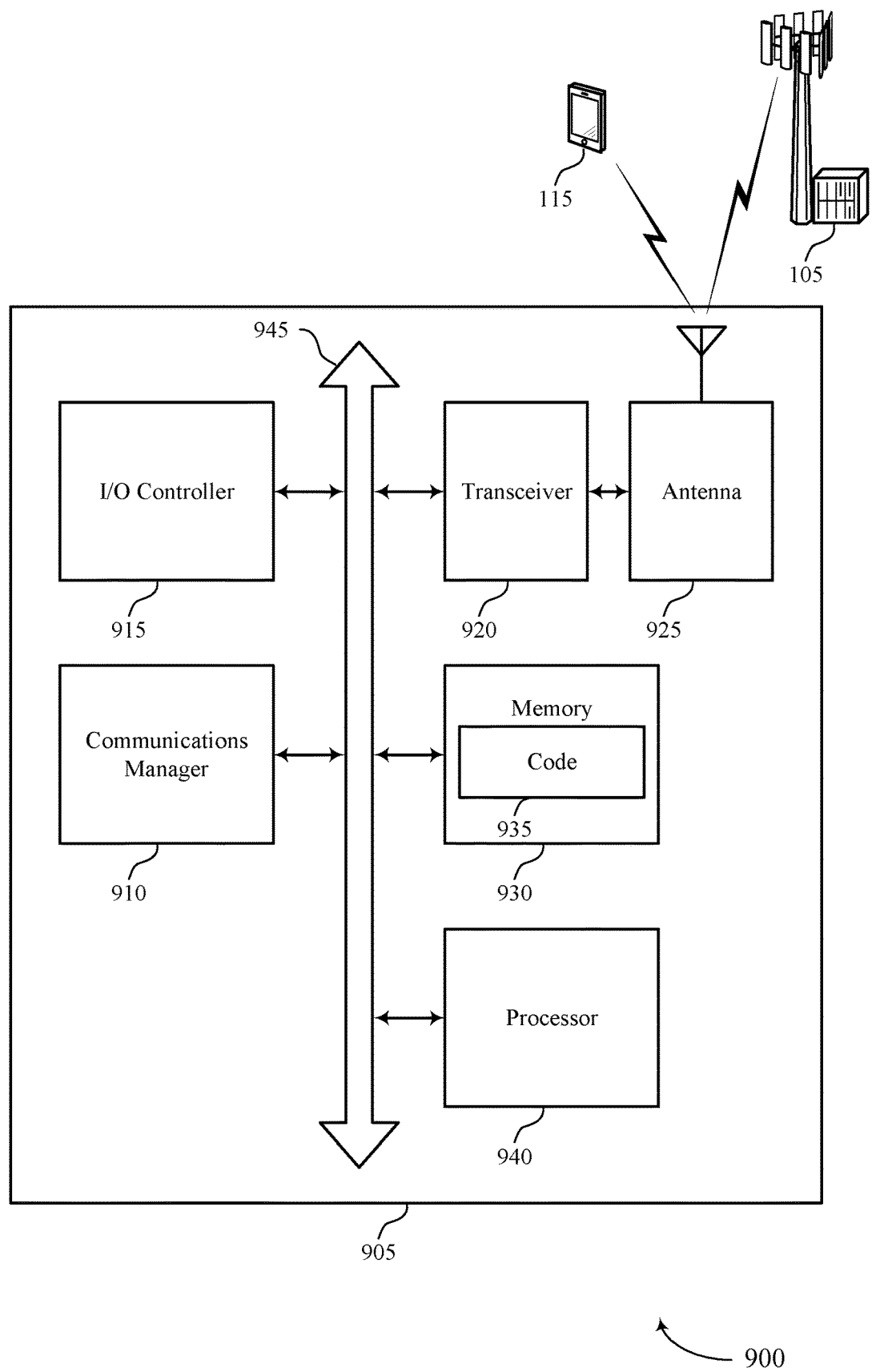
FIG. 9 shows a diagram of a system including a device that supports resource management techniques for full-duplex and half-duplex V2X systems in accordance with one or more aspects of the present disclosure.

FIG. 9 shows a diagram of a system 900 including a device 905 that supports resource management techniques for full-duplex and half-duplex V2X systems in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit a first sidelink control channel during a set of time resources, the first sidelink control channel including scheduling information for transmission of a first sidelink data channel by the device via a first set of time-frequency resources, receive, from a second device, a second sidelink control channel during the set of time resources, the second sidelink control channel including scheduling information for transmission of a second sidelink data channel by the second device via a second set of time-frequency resources, determine that the first set of time-frequency resources and the second set of time-frequency resources at least partially overlap, and perform a resource selection procedure based on determining that the first set of time-frequency resources and the second set of time-frequency resources at least partially overlap.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting resource management techniques for full-duplex and half-duplex V2X systems).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The actions performed by the processor 940, memory 930, I/O controller 915, communications manager 910, transceiver 920, and antenna 925 as described herein may be implemented to realize one or more potential implementations. One implementation may allow the device 905 to save power and increase battery life by performing a resource selection procedure. Another implementation may provide improved data throughput and user experience at the device 905 full-duplex capabilities may be implemented.

Figure 10:
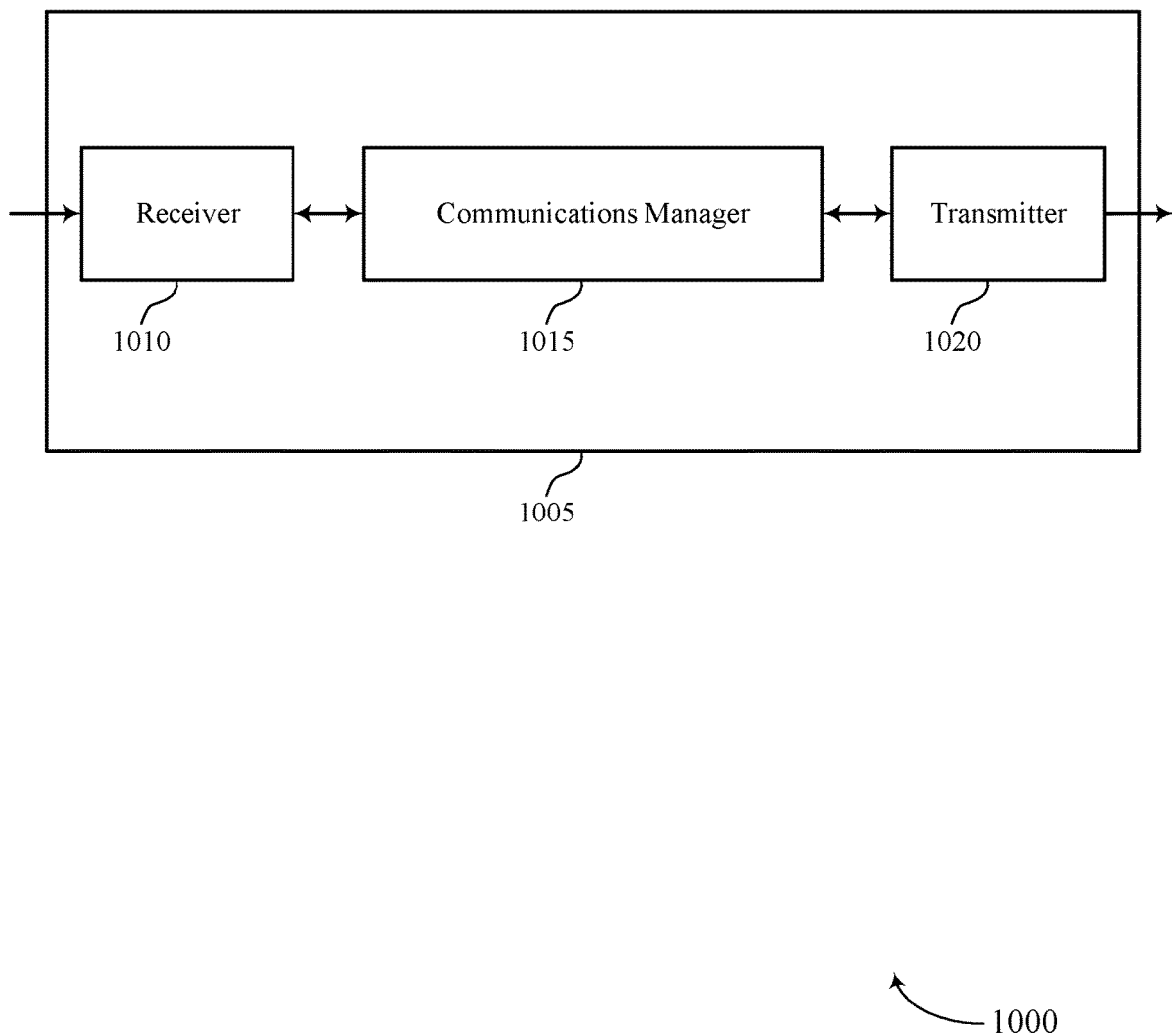
FIGS. 10 and 11 show block diagrams of devices that support resource management techniques for full-duplex and half-duplex V2X systems in accordance with one or more aspects of the present disclosure.

FIG. 10 shows a block diagram 1000 of a device 1005 that supports resource management techniques for full-duplex and half-duplex V2X systems in accordance with one or more aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to resource management techniques for full-duplex and half-duplex V2X systems, etc.). Information may be passed on to other components of the device 1005. The receiver 1010 may be an example of aspects of the transceiver 1320 described with reference to FIG. 9. The receiver 1010 may utilize a single antenna or a set of antennas.

The communications manager 1015 may transmit a first sidelink control channel during a set of time resources, the first sidelink control channel including scheduling information for transmission of a sidelink data channel by the device via a first set of time-frequency resources, receive, from a second device, an indication that the first set of time-frequency resources at least partially overlaps with a second set of time-frequency resources reserved by the second device, and select a third set of time-frequency resources that is different from the reserved set of time-frequency resources based on receiving the indication. The communications manager 1015 may be an example of aspects of the communications manager 1310 described herein.

The communications manager 1015 may be an example of means for performing various aspects of managing sidelink resources for full-duplex and half-duplex devices in V2X systems as described herein. The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

In another implementation, the communications manager 1015, or its sub-components, may be implemented in code (e.g., as communications management software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), an FPGA or other programmable logic device.

In some examples, the communications manager 1015 may be configured to perform various operations (e.g., receiving, selecting, transmitting) using or otherwise in cooperation with the receiver 1010, the transmitter 1020, or both.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 9. The transmitter 1020 may utilize a single antenna or a set of antennas.

Figure 11:
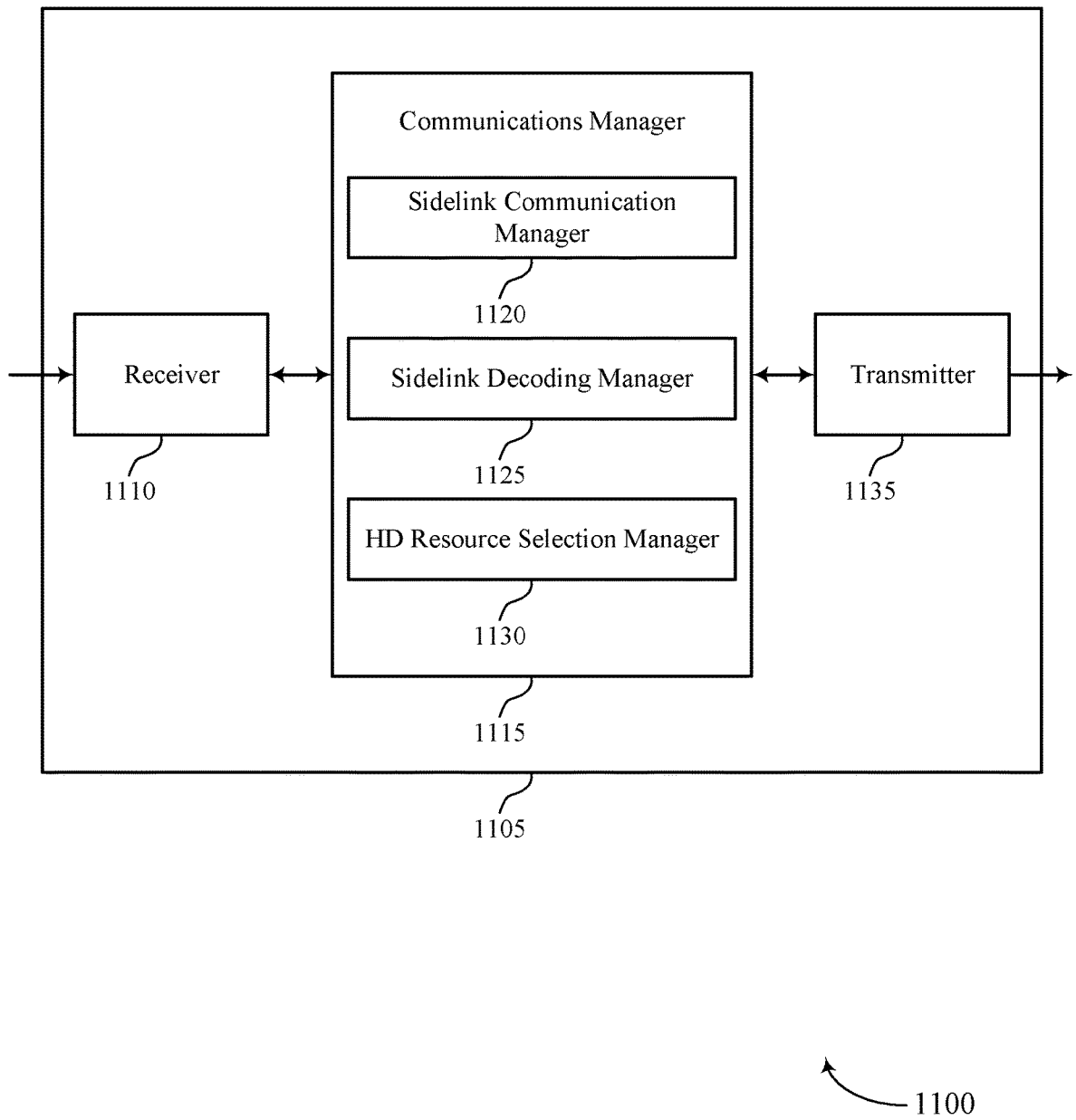

FIG. 11 shows a block diagram 1100 of a device 1105 that supports resource management techniques for full-duplex and half-duplex V2X systems in accordance with one or more aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to resource management techniques for full-duplex and half-duplex V2X systems, etc.). Information may be passed on to other components of the device 1105. The receiver 1110 may be an example of aspects of the transceiver 1320 described with reference to FIG. 9. The receiver 1110 may utilize a single antenna or a set of antennas.

The communications manager 1115 may be an example of aspects of the communications manager 1015 as described herein. The communications manager 1115 may include a sidelink communication manager 1120, a sidelink decoding manager 1125, and a resource collision manager 1130. The communications manager 1115 may be an example of aspects of the communications manager 1015 described herein.

The sidelink communication manager 1120 may transmit a first sidelink control channel during a set of time resources, the first sidelink control channel including scheduling information for transmission of a sidelink data channel by the device via a first set of time-frequency resources.

The sidelink decoding manager 1125 may receive, from a second device, an indication that the first set of time-frequency resources at least partially overlaps with a second set of time-frequency resources reserved by the second device.

The resource collision manager 1130 may select a third set of time-frequency resources that is different from the reserved set of time-frequency resources based on receiving the indication.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 9. The transmitter 1135 may utilize a single antenna or a set of antennas.

Figure 12:
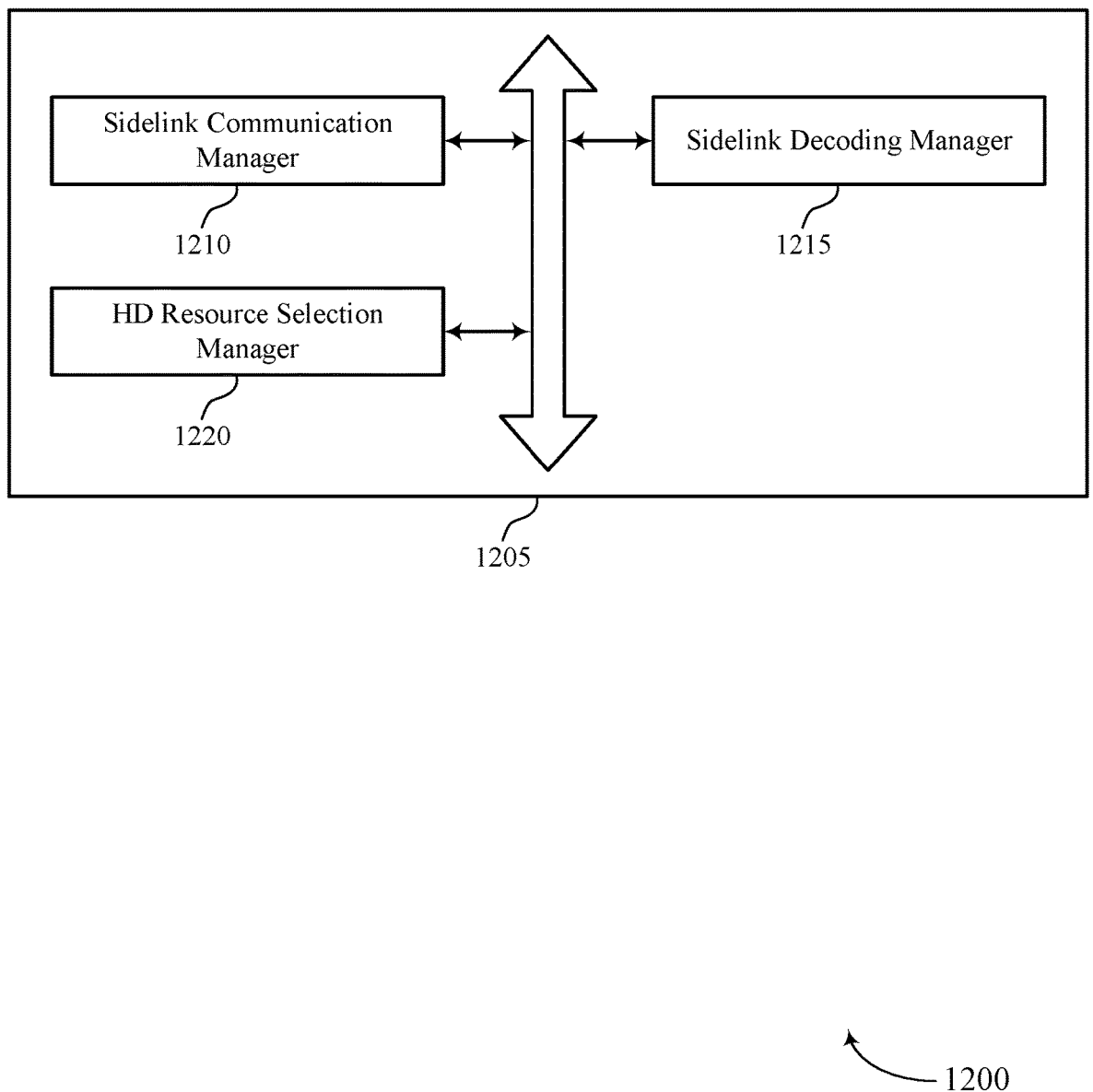
FIG. 12 shows a block diagram of a communications manager that supports resource management techniques for full-duplex and half-duplex V2X systems in accordance with one or more aspects of the present disclosure.

FIG. 12 shows a block diagram 1200 of a communications manager 1205 that supports resource management techniques for full-duplex and half-duplex V2X systems in accordance with one or more aspects of the present disclosure. The communications manager 1205 may be an example of aspects of a communications manager 1015, a communications manager 1115, or a communications manager 1310 described herein. The communications manager 1205 may include a sidelink communication manager 1210, a sidelink decoding manager 1215, and a resource collision manager 1220. Each of these modules may communicate, directly or indirectly, with one another (e.g., via one or more buses).

The sidelink communication manager 1210 may transmit a first sidelink control channel during a set of time resources, the first sidelink control channel including scheduling information for transmission of a sidelink data channel by the device via a first set of time-frequency resources.

In some examples, the sidelink communication manager 1210 may transmit, to the second device, an updated sidelink control channel including updated scheduling information for transmission of the sidelink data channel by the device via the third set of time-frequency resources.

The sidelink decoding manager 1215 may receive, from a second device, an indication that the first set of time-frequency resources at least partially overlaps with a second set of time-frequency resources reserved by the second device.

The resource collision manager 1220 may select a third set of time-frequency resources that is different from the reserved set of time-frequency resources based on receiving the indication.

In some cases, the indication indicates physical resource blocks or time slots, or both, in which the first set of time-frequency resources and the second set of time-frequency resources overlap.

In some cases, the indication includes a single bit indication that indicates the first set of time-frequency resources and the second set of time-frequency resources at least partially overlap.

In some cases, the indication includes a number of resources in which the first set of time-frequency resources and the second set of time-frequency resources overlap.

Figure 13:
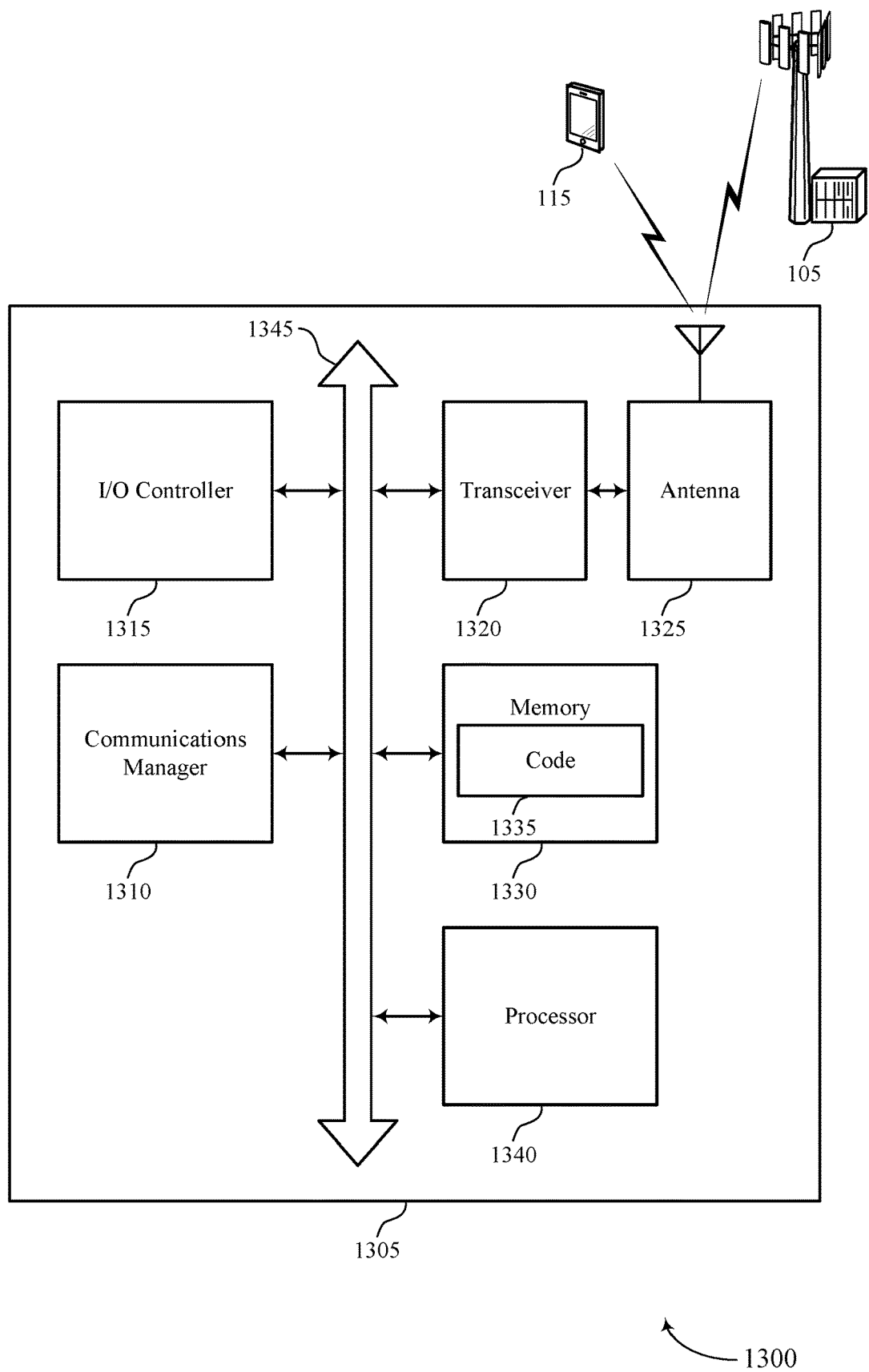
FIG. 13 shows a diagram of a system including a device that supports resource management techniques for full-duplex and half-duplex V2X systems in accordance with one or more aspects of the present disclosure.

FIG. 13 shows a diagram of a system 1300 including a device 1305 that supports resource management techniques for full-duplex and half-duplex V2X systems in accordance with one or more aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may transmit a first sidelink control channel during a set of time resources, the first sidelink control channel including scheduling information for transmission of a sidelink data channel by the device via a first set of time-frequency resources, receive, from a second device, an indication that the first set of time-frequency resources at least partially overlaps with a second set of time-frequency resources reserved by the second device, and select a third set of time-frequency resources that is different from the reserved set of time-frequency resources based on receiving the indication.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting resource management techniques for full-duplex and half-duplex V2X systems).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
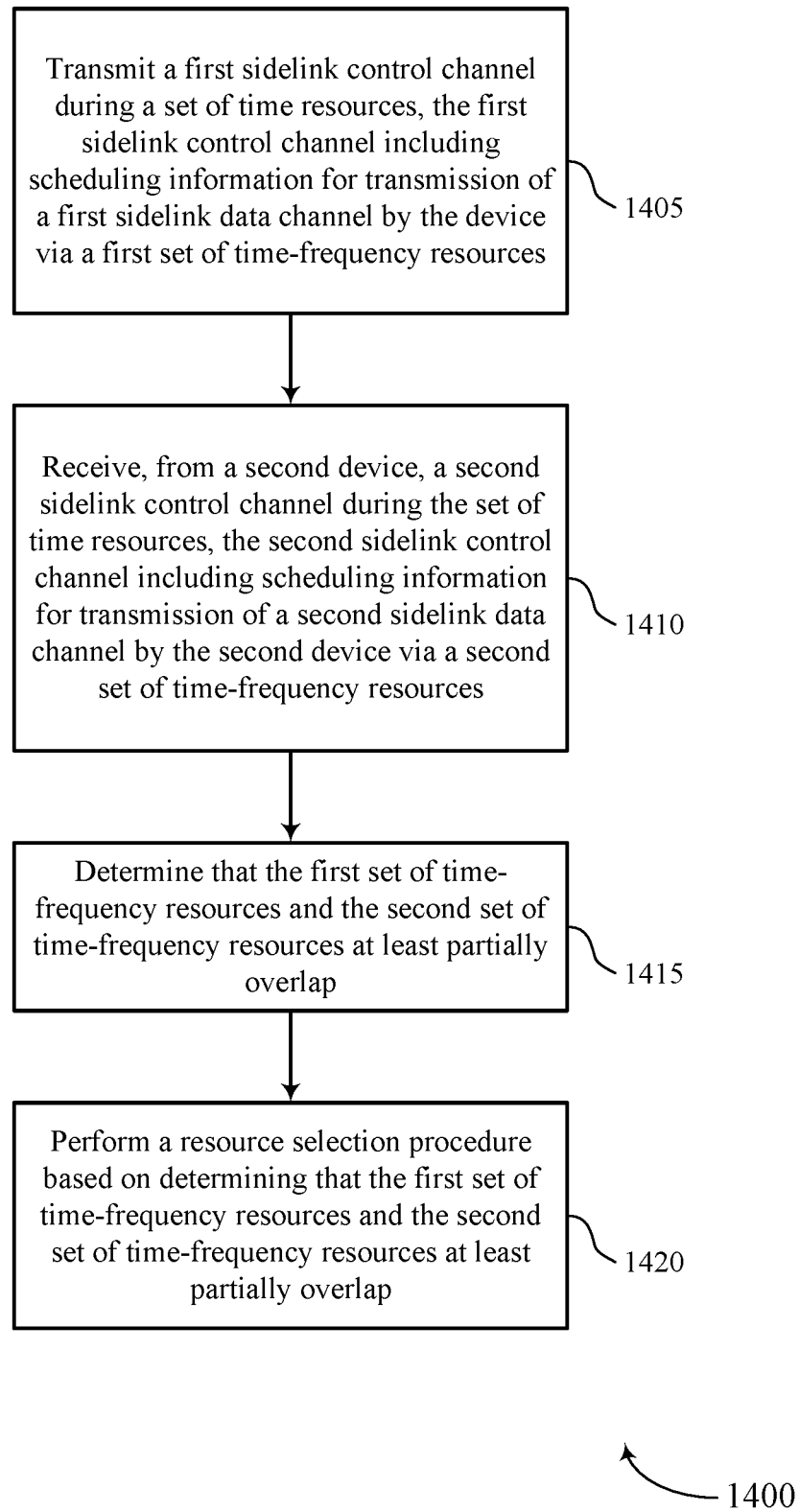
FIGS. 14 through 21 show flowcharts illustrating methods that support resource management techniques for full-duplex and half-duplex V2X systems in accordance with one or more aspects of the present disclosure.

FIG. 14 shows a flowchart illustrating a method 1400 that supports resource management techniques for full-duplex and half-duplex V2X systems in accordance with one or more aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may transmit a first sidelink control channel during a set of time resources, the first sidelink control channel including scheduling information for transmission of a first sidelink data channel by the device via a first set of time-frequency resources. The operations of 1405 may be performed according to the methods described herein. In some examples, aspects of the operations of 1405 may be performed by a sidelink communication manager as described with reference to FIGS. 6 through 9.

At 1410, the UE may receive, from a second device, a second sidelink control channel during the set of time resources, the second sidelink control channel including scheduling information for transmission of a second sidelink data channel by the second device via a second set of time-frequency resources. The operations of 1410 may be performed according to the methods described herein. In some examples, aspects of the operations of 1410 may be performed by a sidelink decoding manager as described with reference to FIGS. 6 through 9.

At 1415, the UE may determine that the first set of time-frequency resources and the second set of time-frequency resources at least partially overlap. The operations of 1415 may be performed according to the methods described herein. In some examples, aspects of the operations of 1415 may be performed by a resource collision manager as described with reference to FIGS. 6 through 9.

At 1420, the UE may perform a resource selection procedure based on determining that the first set of time-frequency resources and the second set of time-frequency resources at least partially overlap. The operations of 1420 may be performed according to the methods described herein. In some examples, aspects of the operations of 1420 may be performed by a full-duplex resource selection manager as described with reference to FIGS. 6 through 9.

Figure 15:
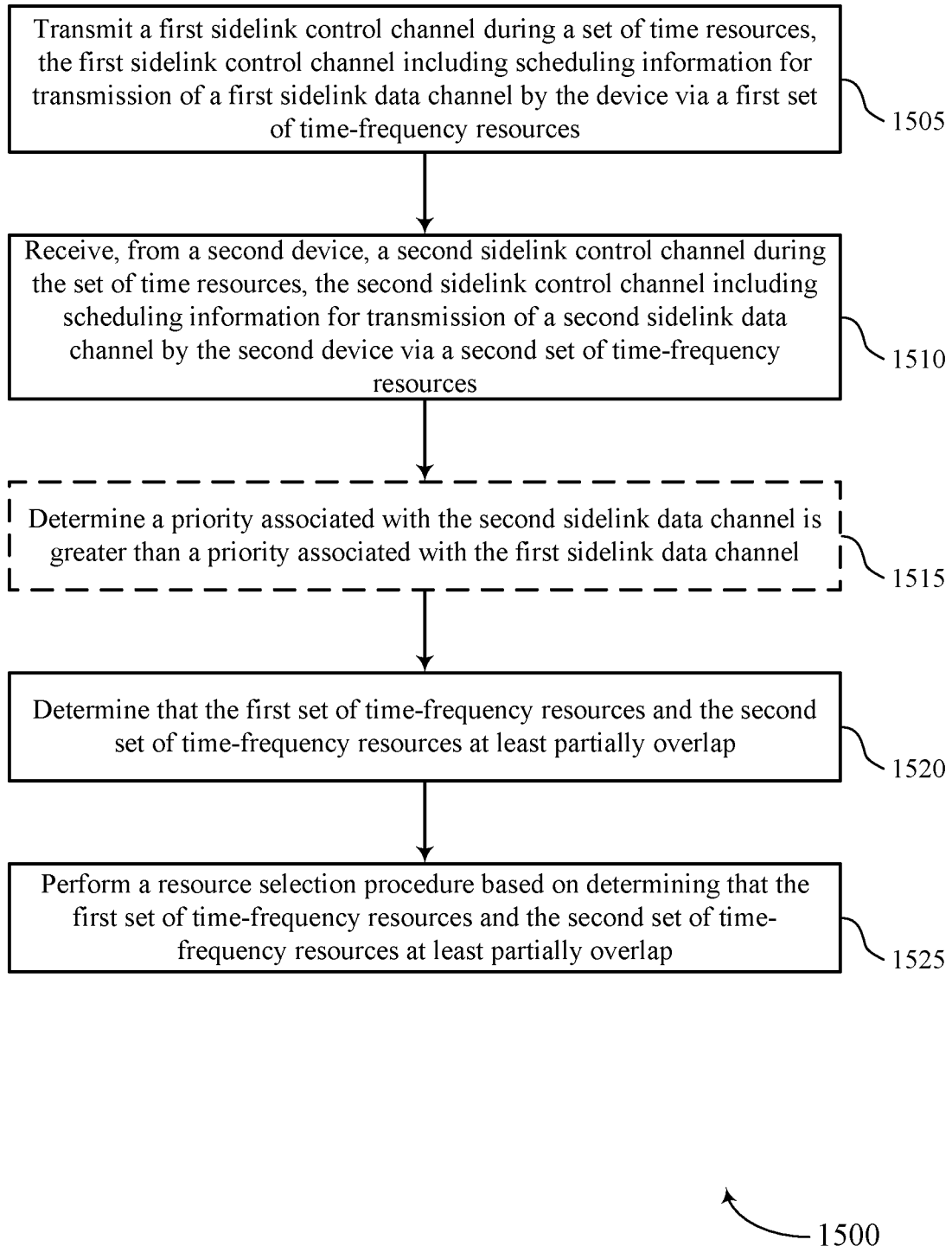

FIG. 15 shows a flowchart illustrating a method 1500 that supports resource management techniques for full-duplex and half-duplex V2X systems in accordance with one or more aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may transmit a first sidelink control channel during a set of time resources, the first sidelink control channel including scheduling information for transmission of a first sidelink data channel by the device via a first set of time-frequency resources. The operations of 1505 may be performed according to the methods described herein. In some examples, aspects of the operations of 1505 may be performed by a sidelink communication manager as described with reference to FIGS. 6 through 9.

At 1510, the UE may receive, from a second device, a second sidelink control channel during the set of time resources, the second sidelink control channel including scheduling information for transmission of a second sidelink data channel by the second device via a second set of time-frequency resources. The operations of 1510 may be performed according to the methods described herein. In some examples, aspects of the operations of 1510 may be performed by a sidelink decoding manager as described with reference to FIGS. 6 through 9.

At 1515, the UE may determine a priority associated with the second sidelink data channel is greater than a priority associated with the first sidelink data channel. The operations of 1515 may be performed according to the methods described herein. In some examples, aspects of the operations of 1515 may be performed by a priority manager as described with reference to FIGS. 6 through 9.

At 1520, the UE may determine that the first set of time-frequency resources and the second set of time-frequency resources at least partially overlap. The operations of 1520 may be performed according to the methods described herein. In some examples, aspects of the operations of 1520 may be performed by a resource collision manager as described with reference to FIGS. 6 through 9.

At 1525, the UE may perform a resource selection procedure based on determining that the first set of time-frequency resources and the second set of time-frequency resources at least partially overlap. The operations of 1525 may be performed according to the methods described herein. In some examples, aspects of the operations of 1525 may be performed by a full-duplex resource selection manager as described with reference to FIGS. 6 through 9.

Figure 16:
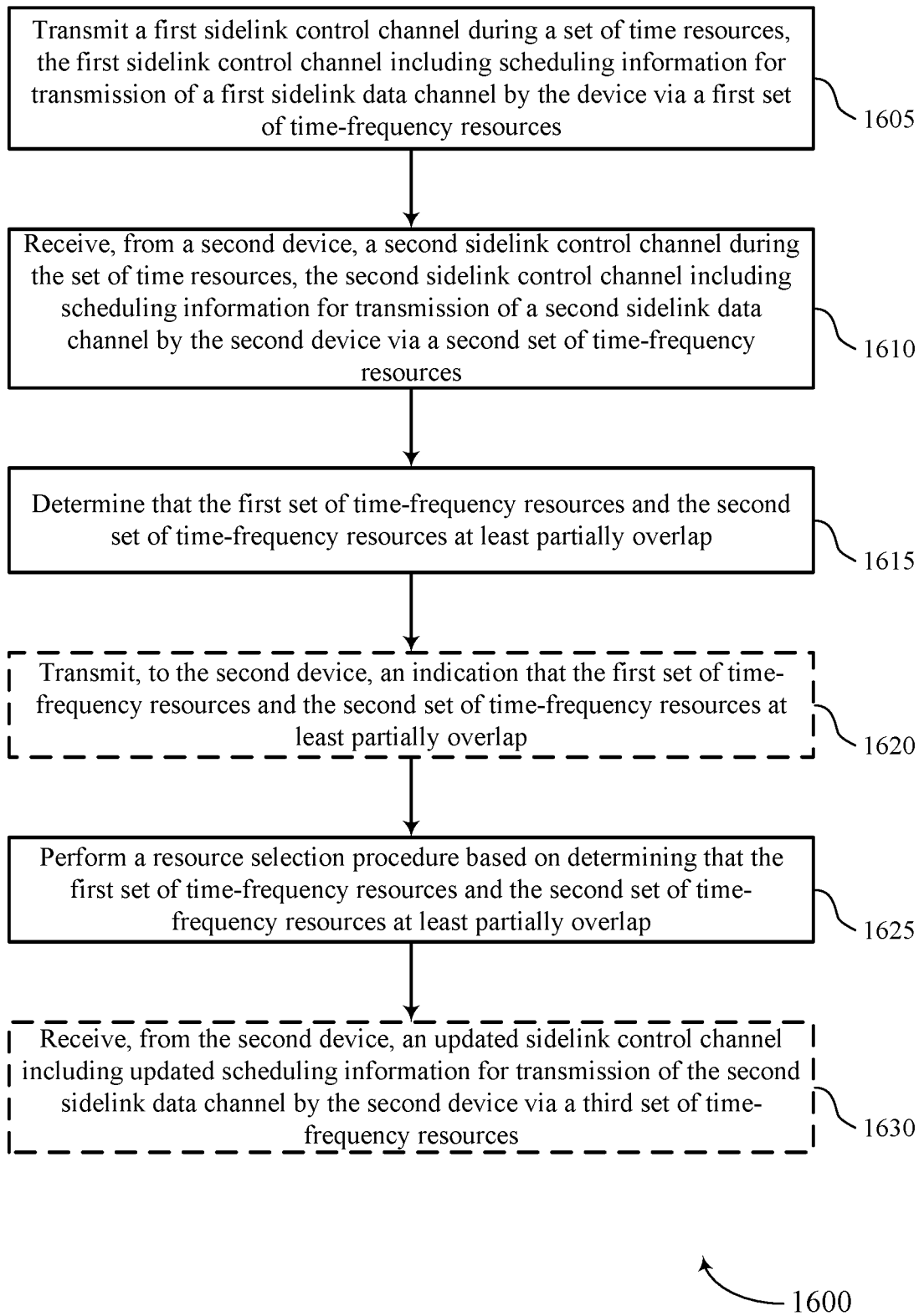

FIG. 16 shows a flowchart illustrating a method 1600 that supports resource management techniques for full-duplex and half-duplex V2X systems in accordance with one or more aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may transmit a first sidelink control channel during a set of time resources, the first sidelink control channel including scheduling information for transmission of a first sidelink data channel by the device via a first set of time-frequency resources. The operations of 1605 may be performed according to the methods described herein. In some examples, aspects of the operations of 1605 may be performed by a sidelink communication manager as described with reference to FIGS. 6 through 9.

At 1610, the UE may receive, from a second device, a second sidelink control channel during the set of time resources, the second sidelink control channel including scheduling information for transmission of a second sidelink data channel by the second device via a second set of time-frequency resources. The operations of 1610 may be performed according to the methods described herein. In some examples, aspects of the operations of 1610 may be performed by a sidelink decoding manager as described with reference to FIGS. 6 through 9.

At 1615, the UE may determine that the first set of time-frequency resources and the second set of time-frequency resources at least partially overlap. The operations of 1615 may be performed according to the methods described herein. In some examples, aspects of the operations of 1615 may be performed by a resource collision manager as described with reference to FIGS. 6 through 9.

At 1620, the UE may transmit, to the second device, an indication that the first set of time-frequency resources and the second set of time-frequency resources at least partially overlap. The operations of 1620 may be performed according to the methods described herein. In some examples, aspects of the operations of 1620 may be performed by a sidelink communication manager as described with reference to FIGS. 6 through 9.

At 1625, the UE may perform a resource selection procedure based on determining that the first set of time-frequency resources and the second set of time-frequency resources at least partially overlap. The operations of 1625 may be performed according to the methods described herein. In some examples, aspects of the operations of 1625 may be performed by a full-duplex resource selection manager as described with reference to FIGS. 6 through 9.

At 1630, the UE may receive, from the second device, an updated sidelink control channel including updated scheduling information for transmission of the second sidelink data channel by the second device via a third set of time-frequency resources. The operations of 1630 may be performed according to the methods described herein. In some examples, aspects of the operations of 1630 may be performed by a sidelink decoding manager as described with reference to FIGS. 6 through 9.

Figure 17:
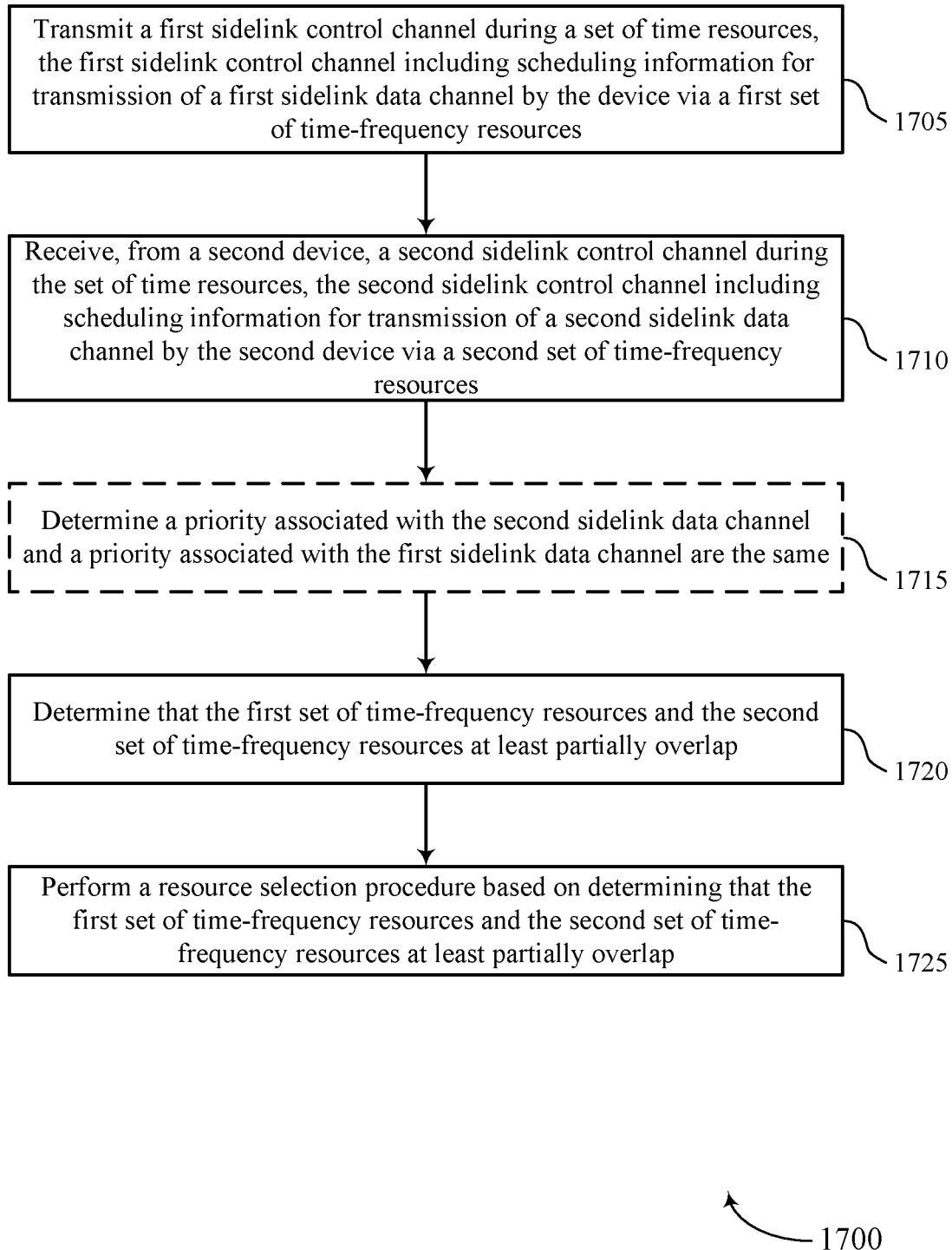

FIG. 17 shows a flowchart illustrating a method 1700 that supports resource management techniques for full-duplex and half-duplex V2X systems in accordance with one or more aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may transmit a first sidelink control channel during a set of time resources, the first sidelink control channel including scheduling information for transmission of a first sidelink data channel by the device via a first set of time-frequency resources. The operations of 1705 may be performed according to the methods described herein. In some examples, aspects of the operations of 1705 may be performed by a sidelink communication manager as described with reference to FIGS. 6 through 9.

At 1710, the UE may receive, from a second device, a second sidelink control channel during the set of time resources, the second sidelink control channel including scheduling information for transmission of a second sidelink data channel by the second device via a second set of time-frequency resources. The operations of 1710 may be performed according to the methods described herein. In some examples, aspects of the operations of 1710 may be performed by a sidelink decoding manager as described with reference to FIGS. 6 through 9.

At 1715, the UE may determine a priority associated with the second sidelink data channel and a priority associated with the first sidelink data channel are the same. The operations of 1715 may be performed according to the methods described herein. In some examples, aspects of the operations of 1715 may be performed by a priority manager as described with reference to FIGS. 6 through 9.

At 1720, the UE may determine that the first set of time-frequency resources and the second set of time-frequency resources at least partially overlap. The operations of 1720 may be performed according to the methods described herein. In some examples, aspects of the operations of 1720 may be performed by a resource collision manager as described with reference to FIGS. 6 through 9.

At 1725, the UE may perform a resource selection procedure based on determining that the first set of time-frequency resources and the second set of time-frequency resources at least partially overlap. The operations of 1725 may be performed according to the methods described herein. In some examples, aspects of the operations of 1725 may be performed by a full-duplex resource selection manager as described with reference to FIGS. 6 through 9.

Figure 18:
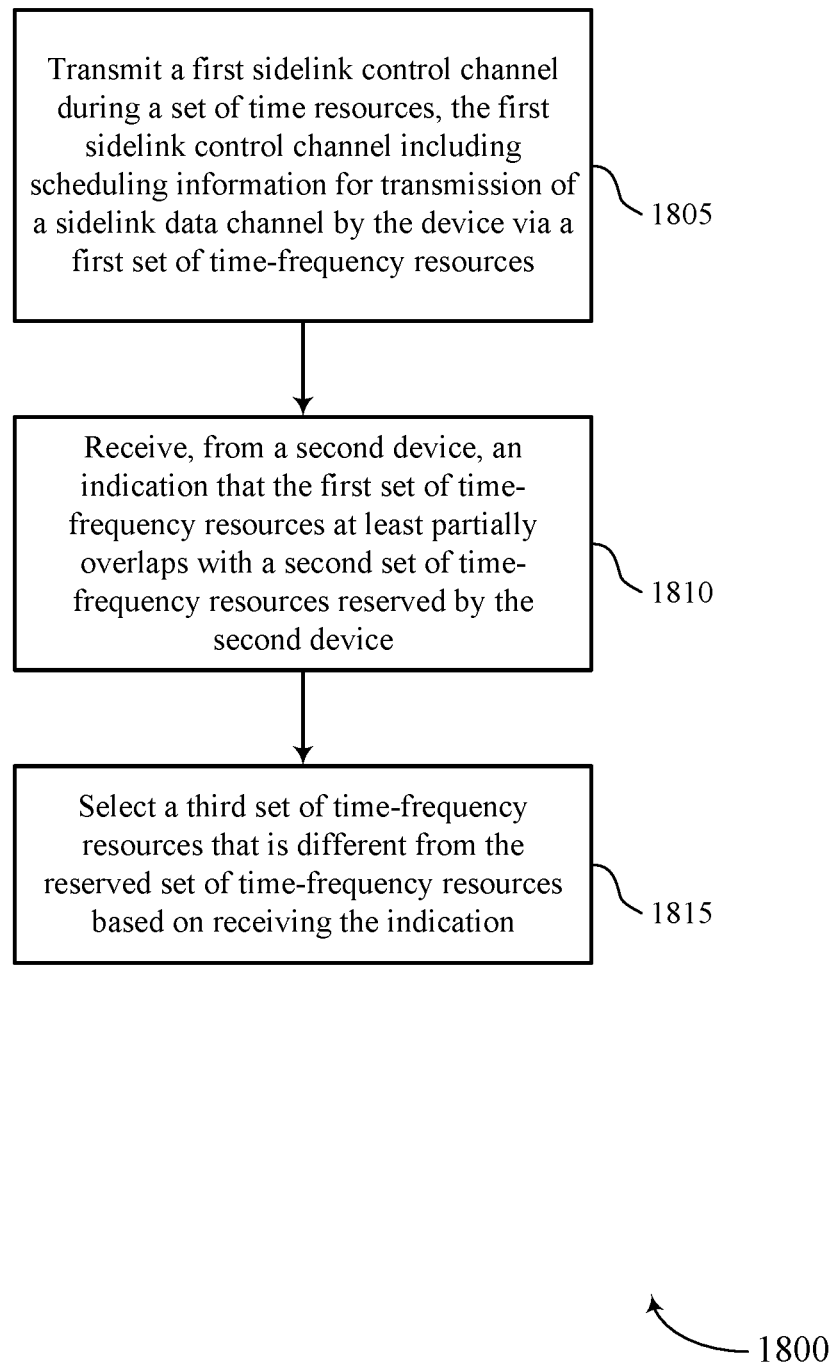

FIG. 18 shows a flowchart illustrating a method 1800 that supports resource management techniques for full-duplex and half-duplex V2X systems in accordance with one or more aspects of the present disclosure. The operations of method 1800 may be implemented by a UE or its components as described herein. For example, the operations of method 1800 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1805, the UE may transmit a first sidelink control channel during a set of time resources, the first sidelink control channel including scheduling information for transmission of a sidelink data channel by the device via a first set of time-frequency resources. The operations of 1805 may be performed according to the methods described herein. In some examples, aspects of the operations of 1805 may be performed by a sidelink communication manager as described with reference to FIGS. 10 through 13.

At 1810, the UE may receive, from a second device, an indication that the first set of time-frequency resources at least partially overlaps with a second set of time-frequency resources reserved by the second device. The operations of 1810 may be performed according to the methods described herein. In some examples, aspects of the operations of 1810 may be performed by a sidelink decoding manager as described with reference to FIGS. 10 through 13.

At 1815, the UE may select a third set of time-frequency resources that is different from the reserved set of time-frequency resources based on receiving the indication. The operations of 1815 may be performed according to the methods described herein. In some examples, aspects of the operations of 1815 may be performed by a half-duplex resource selection manager as described with reference to FIGS. 10 through 13.

Figure 19:
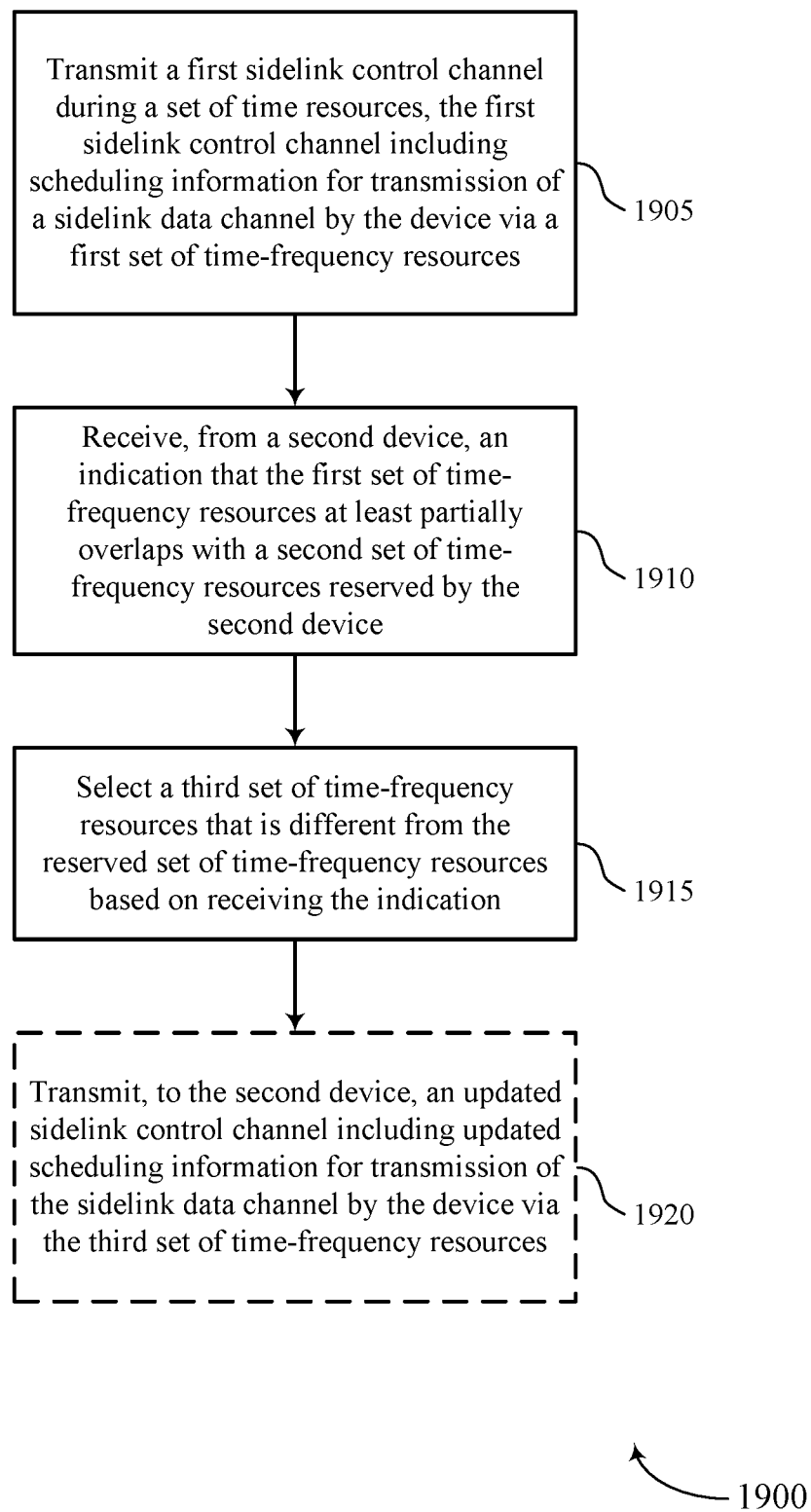

FIG. 19 shows a flowchart illustrating a method 1900 that supports resource management techniques for full-duplex and half-duplex V2X systems in accordance with one or more aspects of the present disclosure. The operations of method 1900 may be implemented by a UE or its components as described herein. For example, the operations of method 1900 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1905, the UE may transmit a first sidelink control channel during a set of time resources, the first sidelink control channel including scheduling information for transmission of a sidelink data channel by the device via a first set of time-frequency resources. The operations of 1905 may be performed according to the methods described herein. In some examples, aspects of the operations of 1905 may be performed by a sidelink communication manager as described with reference to FIGS. 10 through 13.

At 1910, the UE may receive, from a second device, an indication that the first set of time-frequency resources at least partially overlaps with a second set of time-frequency resources reserved by the second device. The operations of 1910 may be performed according to the methods described herein. In some examples, aspects of the operations of 1910 may be performed by a sidelink decoding manager as described with reference to FIGS. 10 through 13.

At 1915, the UE may select a third set of time-frequency resources that is different from the reserved set of time-frequency resources based on receiving the indication. The operations of 1915 may be performed according to the methods described herein. In some examples, aspects of the operations of 1915 may be performed by a half-duplex resource selection manager as described with reference to FIGS. 10 through 13.

At 1920, the UE may transmit, to the second device, an updated sidelink control channel including updated scheduling information for transmission of the sidelink data channel by the device via the third set of time-frequency resources. The operations of 1920 may be performed according to the methods described herein. In some examples, aspects of the operations of 1920 may be performed by a sidelink communication manager as described with reference to FIGS. 10 through 13.

Figure 20:
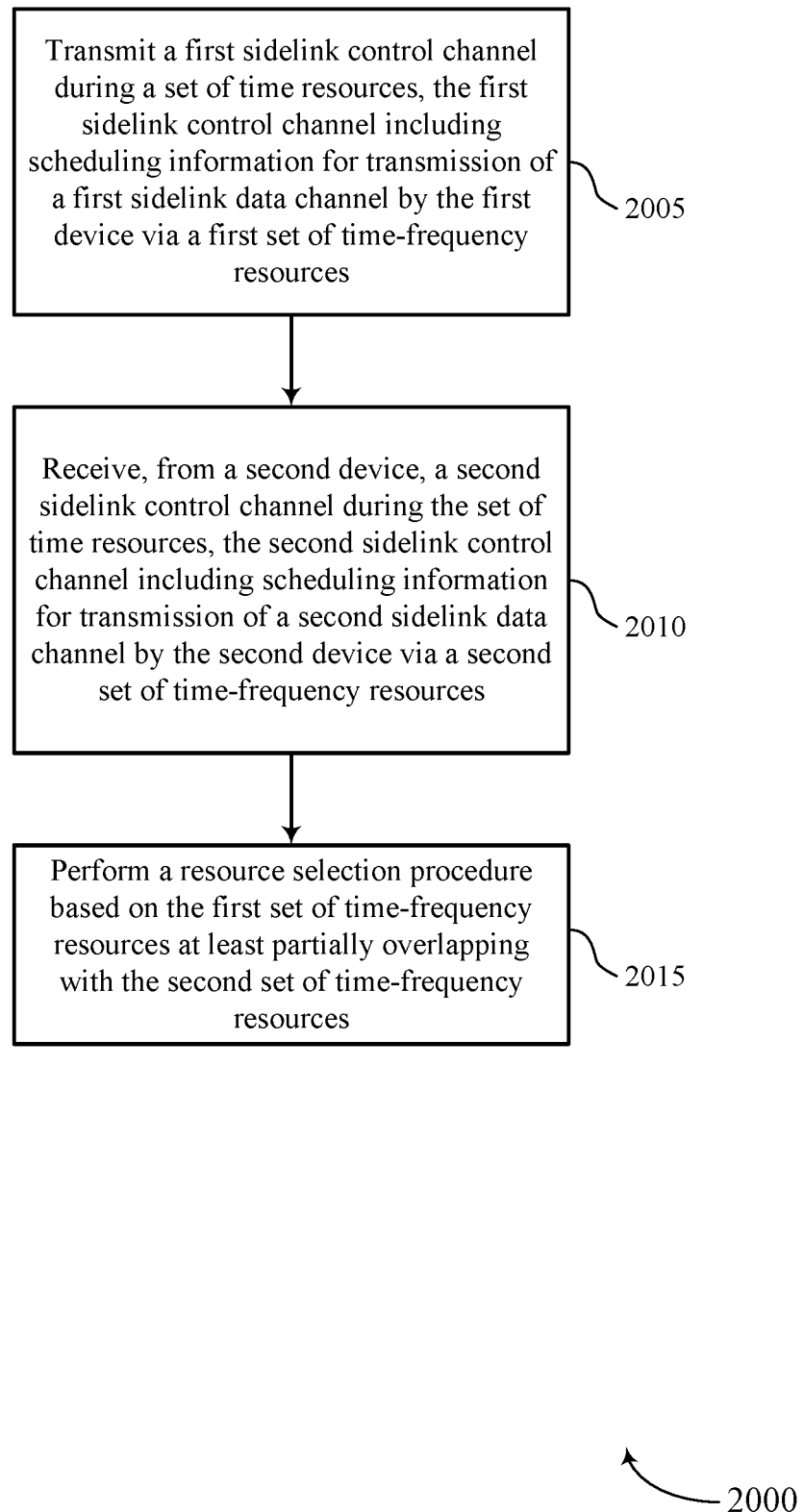

FIG. 20 shows a flowchart illustrating a method 2000 that supports resource management techniques for full-duplex and half-duplex V2X systems in accordance with one or more aspects of the present disclosure. The operations of method 2000 may be implemented by a UE 115 or its components as described herein. For example, the operations of method 2000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 2005, the UE may transmit a first sidelink control channel during a set of time resources, the first sidelink control channel including scheduling information for transmission of a first sidelink data channel by the first device via a first set of time-frequency resources. The operations of 2005 may be performed according to the methods described herein. In some examples, aspects of the operations of 2005 may be performed by a sidelink communication manager as described with reference to FIGS. 6 through 9.

At 2010, the UE may receive, from a second device, a second sidelink control channel during the set of time resources, the second sidelink control channel including scheduling information for transmission of a second sidelink data channel by the second device via a second set of time-frequency resources. The operations of 2010 may be performed according to the methods described herein. In some examples, aspects of the operations of 2010 may be performed by a sidelink decoding manager as described with reference to FIGS. 6 through 9.

At 2015, the UE may perform a resource selection procedure based on the first set of time-frequency resources at least partially overlapping with the second set of time-frequency resources. The operations of 2015 may be performed according to the methods described herein. In some examples, aspects of the operations of 2015 may be performed by a full-duplex resource selection manager as described with reference to FIGS. 6 through 9.

Figure 21:
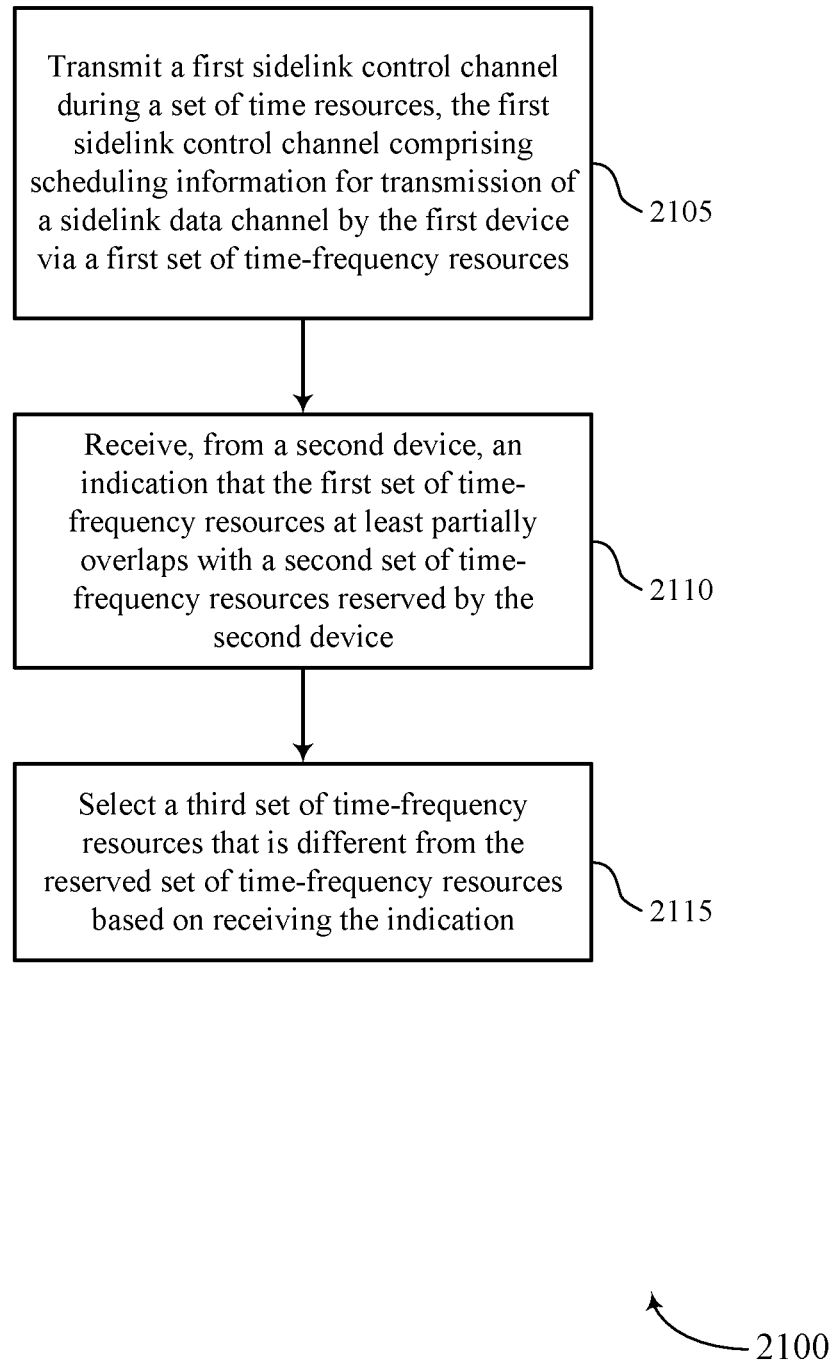

FIG. 21 shows a flowchart illustrating a method 2100 that supports resource management techniques for full-duplex and half-duplex V2X systems in accordance with one or more aspects of the present disclosure. The operations of method 2100 may be implemented by a UE or its components as described herein. For example, the operations of method 2100 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 2105, the UE may transmit a first sidelink control channel during a set of time resources, the first sidelink control channel including scheduling information for transmission of a sidelink data channel by the first device via a first set of time-frequency resources. The operations of 2105 may be performed according to the methods described herein. In some examples, aspects of the operations of 2105 may be performed by a sidelink communication manager as described with reference to FIGS. 10 through 13.

At 2110, the UE may receive, from a second device, an indication that the first set of time-frequency resources at least partially overlaps with a second set of time-frequency resources reserved by the second device. The operations of 2110 may be performed according to the methods described herein. In some examples, aspects of the operations of 2110 may be performed by a sidelink decoding manager as described with reference to FIGS. 10 through 13.

At 2115, the UE may select a third set of time-frequency resources that is different from the reserved set of time-frequency resources based on receiving the indication. The operations of 2115 may be performed according to the methods described herein. In some examples, aspects of the operations of 2115 may be performed by a half-duplex resource selection manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Aspect 1: A method for wireless communications at a first device a wireless network, comprising: transmitting a first sidelink control channel during a set of time resources, the first sidelink control channel comprising scheduling information for transmission of a first sidelink data channel by the first device via a first set of time-frequency resources; receiving, from a second device, a second sidelink control channel during the set of time resources, the second sidelink control channel comprising scheduling information for transmission of a second sidelink data channel by the second device via a second set of time-frequency resources; and performing a resource selection procedure based at least in part on the first set of time-frequency resources at least partially overlapping with the second set of time-frequency resources.

Aspect 2: The method of aspect 1, wherein the first device receives the second sidelink control channel while concurrently transmitting the first sidelink control channel.

Aspect 3: The method of any of aspects 1 through 2, further comprising: determining a priority associated with the second sidelink data channel is greater than a priority associated with the first sidelink data channel.

Aspect 4: The method of aspect 3, further comprising: selecting a third set of time-frequency resources that is different from the second set of time-frequency resources; and transmitting, to the second device, an updated sidelink control channel comprising updated scheduling information for transmission of the first sidelink data channel by the first device via the third set of time-frequency resources.

Aspect 5: The method of any of aspects 3 through 4, further comprising: determining that a signal-to-noise ratio of the received second sidelink control channel satisfies a threshold; and selecting a third set of time-frequency resources that is different from the second set of time-frequency resources, wherein the third set of time-frequency resources comprises a subset of the first set of time-frequency resources based at least in part on the signal-to-noise ratio of the received second sidelink control channel satisfying the threshold.

Aspect 6: The method of aspect 5, wherein the subset of the first set of time-frequency resources comprises at least a portion of time-frequency resources that are different from the second set of time-frequency resources.

Aspect 7: The method of any of aspects 1 through 6, further comprising: transmitting, to the second device, an indication that the first set of time-frequency resources and the second set of time-frequency resources at least partially overlap; and receiving, from the second device, an updated sidelink control channel comprising updated scheduling information for transmission of the second sidelink data channel by the second device via a third set of time-frequency resources.

Aspect 8: The method of aspect 7, wherein the indication is transmitted during a period of time in which the second device is operating in a receive mode.

Aspect 9: The method of any of aspects 7 through 8, wherein the indication indicates physical resource blocks or time slots, or both, in which the first set of time-frequency resources and the second set of time-frequency resources overlap.

Aspect 10: The method of any of aspects 7 through 9, wherein the indication comprises a single bit indication that indicates the first set of time-frequency resources and the second set of time-frequency resources at least partially overlap.

Aspect 11: The method of any of aspects 7 through 10, wherein the indication comprises a number of resources in which the first set of time-frequency resources and the second set of time-frequency resources overlap.

Aspect 12: The method of any of aspects 1 through 11, further comprising: determining a priority associated with the second sidelink data channel and a priority associated with the first sidelink data channel are the same.

Aspect 13: The method of aspect 12, further comprising: determining a second transmission identifier associated with the second sidelink data channel is greater than a first transmission identifier associated with the first sidelink data channel; and selecting a third set of time-frequency resources that is different from the second set of time-frequency resources based at least in part on the determining that the second transmission identifier associated with the second sidelink data channel is greater than the first transmission identifier associated with the first sidelink data channel.

Aspect 14: The method of any of aspects 12 through 13, further comprising: selecting a third set of frequency resources comprising resources at least a portion of the first set of time-frequency resources and the second set of time-frequency resources.

Aspect 15: The method of aspect 14, wherein the third set of frequency resources are randomly selected.

Aspect 16: The method of any of aspects 12 through 15, further comprising: determining a second transmission identifier associated with the second sidelink data channel is less than a first transmission identifier associated with the first sidelink data channel; and selecting a third set of time-frequency resources.

Aspect 17: The method of aspect 16, wherein the third set of time-frequency resources comprises odd numbered resources of the first set of time-frequency resources and the second set of time-frequency resources.

Aspect 18: The method of any of aspects 16 through 17, wherein the third set of time-frequency resources comprises even numbered resources of the first set of time-frequency resources and the second set of time-frequency resources.

Aspect 19: The method of any of aspects 1 through 18, further comprising: transmitting, to the second device, signaling indicating selection of a third set of time-frequency resources by the first device.

Aspect 20: The method of aspect 19, wherein the third set of time-frequency resources comprises resources different than the first set of time-frequency resources and the second set of time-frequency resources.

Aspect 21: The method of any of aspects 19 through 20, wherein the third set of time-frequency resources comprises odd numbered resources of the first set of time-frequency resources and the second set of time-frequency resources.

Aspect 22: The method of any of aspects 19 through 21, wherein the third set of time-frequency resources comprises even numbered resources of the first set of time-frequency resources and the second set of time-frequency resources.

Aspect 23: A method for wireless communications at a first device that supports half-duplex communications in a wireless network, comprising: transmitting a first sidelink control channel during a set of time resources, the first sidelink control channel comprising scheduling information for transmission of a sidelink data channel by the first device via a first set of time-frequency resources; receiving, from a second device, an indication that the first set of time-frequency resources at least partially overlaps with a second set of time-frequency resources reserved by the second device; and selecting a third set of time-frequency resources that is different from the reserved set of time-frequency resources based at least in part on receiving the indication.

Aspect 24: The method of aspect 23, wherein the third set of time-frequency resources comprises a set of resources that overlap between the first set of time-frequency resources and the second set of time-frequency resources.

Aspect 25: The method of any of aspects 23 through 24, further comprising: transmitting, to the second device, an updated sidelink control channel comprising updated scheduling information for transmission of the sidelink data channel by the first device via the third set of time-frequency resources.

Aspect 26: The method of any of aspects 23 through 25, wherein the indication indicates physical resource blocks or time slots, or both, in which the first set of time-frequency resources and the second set of time-frequency resources overlap.

Aspect 27: The method of any of aspects 23 through 26, wherein the indication comprises a single bit indication that indicates the first set of time-frequency resources and the second set of time-frequency resources at least partially overlap.

Aspect 28: An apparatus for wireless communications at a first device a wireless network, comprising a processor; memory coupled with the processor; and instructions stored in the memory and executable by the processor to cause the apparatus to perform a method of any of aspects 1 through 22.

Aspect 29: An apparatus for wireless communications at a first device a wireless network, comprising at least one means for performing a method of any of aspects 1 through 22.

Aspect 30: A non-transitory computer-readable medium storing code for wireless communications at a first device a wireless network, the code comprising instructions executable by a processor to perform a method of any of aspects 1 through 22.

Aspect 31: An apparatus for wireless communications at a first device that supports half-duplex communications in a wireless network, comprising a processor and memory coupled to the processor, the processor and memory configured to perform a method of any one of aspects 23 through 27.

Aspect 32: An apparatus for wireless communications at a first device that supports half-duplex communications in a wireless network, comprising at least one means for performing a method of any of aspects 23 through 27.

Aspect 33: A non-transitory computer-readable medium storing code for wireless communications at a first device that supports half-duplex communications in a wireless network, the code comprising instructions executable by a processor to perform a method of any of aspects 23 through 27.

Aspect 34: A method for wireless communications at a device that supports full-duplex communications in a wireless network, comprising: transmitting a first sidelink control channel during a set of time resources, the first sidelink control channel comprising scheduling information for transmission of a first sidelink data channel by the device via a first set of time-frequency resources; receiving, from a second device, a second sidelink control channel during the set of time resources, the second sidelink control channel comprising scheduling information for transmission of a second sidelink data channel by the second device via a second set of time-frequency resources; determining that the first set of time-frequency resources and the second set of time-frequency resources at least partially overlap; and performing a resource selection procedure based at least in part on determining that the first set of time-frequency resources and the second set of time-frequency resources at least partially overlap.

Aspect 35: The method of aspect 34, further comprising: determining a priority associated with the second sidelink data channel is greater than a priority associated with the first sidelink data channel.

Aspect 36: The method of aspect 35, the performing the resource selection procedure comprising: selecting a third set of time-frequency resources that is different from the second set of time-frequency resources; and transmitting, to the second device, an updated sidelink control channel comprising updated scheduling information for transmission of the first sidelink data channel by the device via the third set of time-frequency resources.

Aspect 37: The method of any one of aspects 35 through 36, the performing the resource selection procedure comprising: determining that a signal-to-noise ratio of the received second sidelink control channel satisfies a threshold; and selecting a third set of time-frequency resources that is different from the second set of time-frequency resources, wherein the third set of time-frequency resources comprises a subset of the first set of time-frequency resources based at least in part on the signal-to-noise ratio of the received second sidelink control channel satisfying the threshold.

Aspect 38: The method of aspect 37, wherein the subset of the first set of time-frequency resources comprises at least a portion of time-frequency resources that are different from the second set of time-frequency resources.

Aspect 39: The method of any one of aspects 34 through 38, the performing the resource selection procedure comprising: transmitting, to the second device, an indication that the first set of time-frequency resources and the second set of time-frequency resources at least partially overlap; and receiving, from the second device, an updated sidelink control channel comprising updated scheduling information for transmission of the second sidelink data channel by the second device via a third set of time-frequency resources.

Aspect 40: The method of aspect 39, wherein the indication is transmitted during a period of time in which the second device is operating in a receive mode.

Aspect 41: The method of any one of aspects 39 through 40, wherein the indication indicates physical resource blocks or time slots, or both, in which the first set of time-frequency resources and the second set of time-frequency resources overlap.

Aspect 42: The method of any one of aspects 39 through 41, wherein the indication comprises a single bit indication that indicates the first set of time-frequency resources and the second set of time-frequency resources at least partially overlap.

Aspect 43: The method of any one of aspects 39 through 42, wherein the indication comprises a number of resources in which the first set of time-frequency resources and the second set of time-frequency resources overlap.

Aspect 44: The method of any one of aspects 34 through 43, further comprising: determining a priority associated with the second sidelink data channel and a priority associated with the first sidelink data channel are the same.

Aspect 45: The method of aspect 44, the performing the resource selection procedure comprising: determining a transmission identifier associated with the second sidelink data channel is greater than a transmission identifier associated with the first sidelink data channel; and selecting a third set of time-frequency resources that is different from the second set of time-frequency resources based at least in part on the determining that the transmission identifier associated with the second sidelink data channel is greater than the transmission identifier associated with the first sidelink data channel.

Aspect 46: The method of any one of aspects 44 through 45, the performing the resource selection procedure comprising: selecting a third set of frequency resources comprising resources at least a portion of the first set of time-frequency resources and the second set of time-frequency resources.

Aspect 47: The method of aspect 46, wherein the third set of frequency resources are randomly selected.

Aspect 48: The method of any one of aspects 44 through 46, the performing the resource selection procedure comprising: determining a transmission identifier associated with the second sidelink data channel is less than a transmission identifier associated with the first sidelink data channel; and selecting a third set of time-frequency resources.

Aspect 49: The method of aspect 48, wherein the third set of time-frequency resources comprises odd numbered resources of the first set of time-frequency resources and the second set of time-frequency resources.

Aspect 50: The method of any one of aspects 48 through 49, wherein the third set of time-frequency resources comprises even numbered resources of the first set of time-frequency resources and the second set of time-frequency resources.

Aspect 51: The method of any one of aspects 34 through 50, further comprising: transmitting, to the second device, signaling indicating selection of a third set of time-frequency resources by the device.

Aspect 52: The method of aspect 51, wherein the third set of time-frequency resources comprises resources different than the first set of time-frequency resources and the second set of time-frequency resources.

Aspect 53: The method of any one of aspects 51 through 52, wherein the third set of time-frequency resources comprises odd numbered resources of the first set of time-frequency resources and the second set of time-frequency resources.

Aspect 54: The method of any one of aspects 51 through 53, wherein the third set of time-frequency resources comprises even numbered resources of the first set of time-frequency resources and the second set of time-frequency resources.

Aspect 55: The method of any one of aspects 34 through 54, further comprising: transmitting, to the second device, a request for the second device to select a third set of time-frequency resources.

Aspect 56: A method for wireless communications at a device that supports half-duplex communications in a wireless network, comprising: transmitting a first sidelink control channel during a set of time resources, the first sidelink control channel comprising scheduling information for transmission of a sidelink data channel by the device via a first set of time-frequency resources; receiving, from a second device, an indication that the first set of time-frequency resources at least partially overlaps with a second set of time-frequency resources reserved by the second device; and selecting a third set of time-frequency resources that is different from the reserved set of time-frequency resources based at least in part on receiving the indication.

Aspect 57: The method of aspect 56, further comprising: transmitting, to the second device, an updated sidelink control channel comprising updated scheduling information for transmission of the sidelink data channel by the device via the third set of time-frequency resources.

Aspect 58: The method of any one of aspects 56 through 57, wherein the indication indicates physical resource blocks or time slots, or both, in which the first set of time-frequency resources and the second set of time-frequency resources overlap.

Aspect 59: The method of any one of aspects 56 through 58, wherein the indication comprises a single bit indication that indicates the first set of time-frequency resources and the second set of time-frequency resources at least partially overlap.

Aspect 60: The method of any one of aspects 56 through 59, wherein the indication comprises a number of resources in which the first set of time-frequency resources and the second set of time-frequency resources overlap.

Aspect 61: An apparatus for wireless communications comprising at least one means for performing a method of any one of aspects 34 through 55.

Aspect 62: An apparatus for wireless communications comprising a processor and memory coupled to the processor, the processor and memory configured to perform a method of any one of aspects 34 through 55.

Aspect 63: A non-transitory computer-readable medium storing code for wireless communications, the code comprising instructions executable by a processor to perform a method of any one of aspects 34 through 55.

Aspect 64: An apparatus for wireless communications comprising at least one means for performing a method of any one of aspects 56 through 60.

Aspect 65: An apparatus for wireless communications comprising a processor and memory coupled to the processor, the processor and memory configured to perform a method of any one of aspects 56 through 60.

Aspect 66: A non-transitory computer-readable medium storing code for wireless communications, the code comprising instructions executable by a processor to perform a method of any one of aspects 56 through 60.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first device, comprising:
   one or more memories; and
   one or more processors coupled with the one or more memories and configured to cause the first device to:
   transmit a first sidelink control channel during a set of time resources, the first sidelink control channel comprising first sidelink control information that indicates scheduling information for transmission of a first sidelink data channel reserved by the first device via a first set of time-frequency resources;
   receive, from a second device, a second sidelink control channel during the set of time resources, the second sidelink control channel comprising second sidelink control information that indicates scheduling information for transmission of a second sidelink data channel reserved by the second device via a second set of time-frequency resources; and
   perform a resource selection procedure based at least in part on a partial overlap between the first set of time-frequency resources and the second set of time-frequency resources.

2. The apparatus of claim 1, wherein the one or more processors are further configured to cause the first device to:
   determine a priority associated with the second sidelink data channel is greater than a priority associated with the first sidelink data channel.

3. The apparatus of claim 2, wherein the one or more processors are further configured to cause the first device to:
   select a third set of time-frequency resources that is different from the second set of time-frequency resources; and
   transmit, to the second device, an updated sidelink control channel comprising updated scheduling information for transmission of the first sidelink data channel by the first device via the third set of time-frequency resources.

4. The apparatus of claim 2, wherein the one or more processors are further configured to cause the first device to:

determine that a signal-to-noise ratio of the received second sidelink control channel satisfies a threshold; and select a third set of time-frequency resources that is different from the second set of time-frequency resources, wherein the third set of time-frequency resources comprises a subset of the first set of time-frequency resources based at least in part on the determination that the signal-to-noise ratio of the received second sidelink control channel satisfies the threshold.

5. The apparatus of claim 4, wherein the subset of the first set of time-frequency resources comprises at least a portion of time-frequency resources that are different from the second set of time-frequency resources.

6. The apparatus of claim 1, wherein the one or more processors are further configured to cause the first device to:
transmit, to the second device, an indication that the first set of time-frequency resources and the second set of time-frequency resources at least partially overlap; and
receive, from the second device, an updated sidelink control channel comprising updated scheduling information for transmission of the second sidelink data channel by the second device via a third set of time-frequency resources.

7. The apparatus of claim 6, wherein the indication is transmitted during a period of time in which the second device operates in a receive mode.

8. The apparatus of claim 6, wherein the indication indicates physical resource blocks or time slots, or both, in which the first set of time-frequency resources and the second set of time-frequency resources overlap.

9. The apparatus of claim 6, wherein the indication comprises a single bit indication that indicates the first set of time-frequency resources and the second set of time-frequency resources at least partially overlap.

10. The apparatus of claim 6, wherein the indication comprises a number of time-frequency resources in which the first set of time-frequency resources and the second set of time-frequency resources overlap.

11. The apparatus of claim 1, wherein the one or more processors are further configured to cause the first device to:
determine a priority associated with the second sidelink data channel and a priority associated with the first sidelink data channel are the same.

12. The apparatus of claim 11, wherein the one or more processors are further configured to cause the first device to:
determine a second transmission identifier associated with the second sidelink data channel is greater than a first transmission identifier associated with the first sidelink data channel; and
select a third set of time-frequency resources that is different from the second set of time-frequency resources based at least in part on the second transmission identifier determined to be associated with the second sidelink data channel being greater than the first transmission identifier associated with the first sidelink data channel.

13. The apparatus of claim 11, wherein the one or more processors are further configured to cause the first device to:
select a third set of time-frequency resources comprising at least a portion of the first set of time-frequency resources and the second set of time-frequency resources.

14. The apparatus of claim 13, wherein:
the third set of time-frequency resources are randomly selected.

15. The apparatus of claim 11, wherein the one or more processors are further configured to cause the first device to:
determine a second transmission identifier associated with the second sidelink data channel is less than a first transmission identifier associated with the first sidelink data channel; and
select a third set of time-frequency resources.

16. The apparatus of claim 15, wherein the third set of time-frequency resources comprises odd numbered resources of the first set of time-frequency resources and the second set of time-frequency resources.

17. The apparatus of claim 15, wherein the third set of time-frequency resources comprises even numbered resources of the first set of time-frequency resources and the second set of time-frequency resources.

18. The apparatus of claim 1, wherein the one or more processors are further configured to cause the first device to:
transmit, to the second device, one or more signals that indicates selection of a third set of time-frequency resources by the first device.

19. The apparatus of claim 18, wherein the third set of time-frequency resources comprises time-frequency resources different than the first set of time-frequency resources and the second set of time-frequency resources.

20. The apparatus of claim 18, wherein the third set of time-frequency resources comprises odd numbered resources of the first set of time-frequency resources and the second set of time-frequency resources.

21. The apparatus of claim 18, wherein the third set of time-frequency resources comprises even numbered resources of the first set of time-frequency resources and the second set of time-frequency resources.

22. The apparatus of claim 1, further comprising:
an antenna array, wherein the first device receives the second sidelink control channel during transmission of the first sidelink control channel.

23. An apparatus for wireless communications at a first device, comprising:
one or more memories; and
one or more processors coupled with the one or more memories and configured to cause the first device to
transmit a first sidelink control channel during a set of time resources, the first sidelink control channel comprising sidelink control information that indicates scheduling information for transmission of a sidelink data channel reserved by the first device via a first set of time-frequency resources;
receive, from a second device, an indication that the first set of time-frequency resources at least partially overlaps with a second set of time-frequency resources reserved by the second device; and
select a third set of time-frequency resources that is different from the second set of time-frequency resources based at least in part on the received indication.

24. The apparatus of claim 23, wherein the third set of time-frequency resources comprises a set of resources that overlap between the first set of time-frequency resources and the second set of time-frequency resources.

25. The apparatus of claim 23, wherein the one or more processors are further configured to cause the first device to:
transmit, to the second device, an updated sidelink control channel comprising updated scheduling information for transmission of the sidelink data channel by the first device via the third set of time-frequency resources.

26. The apparatus of claim 23, wherein the indication indicates physical resource blocks or time slots, or both, in which the first set of time-frequency resources and the second set of time-frequency resources overlap.

27. The apparatus of claim 23, wherein the indication comprises a single bit indication that indicates the first set of time-frequency resources and the second set of time-frequency resources at least partially overlap.

28. A method for wireless communications at a first device in a wireless network, comprising:
transmitting a first sidelink control channel during a set of time resources, the first sidelink control channel comprising first sidelink control information indicating scheduling information for transmission of a first sidelink data channel reserved by the first device via a first set of time-frequency resources;
receiving, from a second device, a second sidelink control channel during the set of time resources, the second sidelink control channel comprising second sidelink control information indicating scheduling information for transmission of a second sidelink data channel reserved by the second device via a second set of time-frequency resources; and
performing a resource selection procedure based at least in part on the first set of time-frequency resources at least partially overlapping with the second set of time-frequency resources.

29. The method of claim 28, wherein the first device receives the second sidelink control channel while concurrently transmitting the first sidelink control channel.

30. The method of claim 28, further comprising:
determining a priority associated with the second sidelink data channel is greater than a priority associated with the first sidelink data channel.

31. The method of claim 28, further comprising:
transmitting, to the second device, an indication that the first set of time-frequency resources and the second set of time-frequency resources at least partially overlap; and
receiving, from the second device, an updated sidelink control channel comprising updated scheduling information for transmission of the second sidelink data channel by the second device via a third set of time-frequency resources.

32. The method of claim 28, further comprising:
determining a priority associated with the second sidelink data channel and a priority associated with the first sidelink data channel are the same.

33. The method of claim 28, further comprising:
transmit, to the second device, one or more signals that indicates selection of a third set of time-frequency resources by the first device.

34. A method for wireless communications at a first device in a wireless network, comprising:
transmitting a first sidelink control channel during a set of time resources, the first sidelink control channel comprising first sidelink control information indicating scheduling information for transmission of a sidelink data channel reserved by the first device via a first set of time-frequency resources;
receiving, from a second device, an indication that the first set of time-frequency resources at least partially overlaps with a second set of time-frequency resources reserved by the second device; and
selecting a third set of time-frequency resources that is different from the second set of time-frequency resources based at least in part on receiving the indication.

35. The method of claim 34, wherein the third set of time-frequency resources comprises a set of resources that overlap between the first set of time-frequency resources and the second set of time-frequency resources.

36. The method of claim 34, further comprising:
transmitting, to the second device, an updated sidelink control channel comprising updated scheduling information for transmission of the sidelink data channel by the first device via the third set of time-frequency resources.

37. The method of claim 34, wherein the indication indicates physical resource blocks or time slots, or both, in which the first set of time-frequency resources and the second set of time-frequency resources overlap.

38. The method of claim 34, wherein the indication comprises a single bit indication that indicates the first set of time-frequency resources and the second set of time-frequency resources at least partially overlap.

39. A non-transitory computer-readable medium storing code for wireless communications at a first device, the code comprising instructions executable by one or more processors to cause the first device to:
transmit a first sidelink control channel during a set of time resources, the first sidelink control channel comprising first sidelink control information indicating scheduling information for transmission of a first sidelink data channel reserved by the first device via a first set of time-frequency resources;
receive, from a second device, a second sidelink control channel during the set of time resources, the second sidelink control channel comprising second sidelink control information indicating scheduling information for transmission of a second sidelink data channel reserved by the second device via a second set of time-frequency resources; and
perform a resource selection procedure based at least in part on the first set of time-frequency resources at least partially overlapping with the second set of time-frequency resources.

40. A non-transitory computer-readable medium storing code for wireless communications at a first device, the code comprising instructions executable by one or more processors to cause the first device to:
transmit a first sidelink control channel during a set of time resources, the first sidelink control channel comprising first sidelink control information indicating scheduling information for transmission of a sidelink data channel reserved by the first device via a first set of time-frequency resources;
receive, from a second device, an indication that the first set of time-frequency resources at least partially overlaps with a second set of time-frequency resources reserved by the second device; and
select a third set of time-frequency resources that is different from the second set of time-frequency resources based at least in part on receiving the indication.

* * * * *